(12) United States Patent
Miller et al.

(10) Patent No.: US 12,421,854 B1
(45) Date of Patent: *Sep. 23, 2025

(54) GAS TURBINE ENGINE WITH ACOUSTIC SPACING OF THE FAN BLADES AND OUTLET GUIDE VANES

(71) Applicant: General Electric Company, Evendale, OH (US)

(72) Inventors: Brandon Wayne Miller, Evendale, OH (US); Egbert Geertsema, Evendale, OH (US); Arthur W. Sibbach, Boxford, MA (US); Andrew Hudecki, Evendale, OH (US); Timothy Richard DePuy, Evendale, OH (US); John C. Schilling, Evendale, OH (US); Frank Worthoff, Evendale, OH (US); Tsuguji Nakano, Evendale, OH (US)

(73) Assignee: General Electric Company, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/190,284

(22) Filed: Apr. 25, 2025

Related U.S. Application Data

(63) Continuation-in-part of application No. 18/744,069, filed on Jun. 14, 2024, now Pat. No. 12,292,017.

(51) Int. Cl.
| | |
|---|---|
| *F01D 5/14* | (2006.01) |
| *F01D 5/28* | (2006.01) |
| *F01D 25/24* | (2006.01) |

(52) U.S. Cl.
CPC ............. *F01D 5/141* (2013.01); *F01D 5/282* (2013.01); *F01D 25/24* (2013.01);
(Continued)

(58) Field of Classification Search
CPC .... F02K 3/06; F02C 7/045; F02C 7/24; F04D 29/666; F05D 2220/36; F05D 2240/12; F05D 2260/96; F05D 2300/603
See application file for complete search history.

(56) References Cited

U.S. PATENT DOCUMENTS 3,505,819 A * 4/1970 Wilde ..................... F02K 3/068
 417/406
3,534,556 A 10/1970 Wilde
(Continued)

FOREIGN PATENT DOCUMENTS

EP 3 085 897 B1 9/2021

OTHER PUBLICATIONS

Gliebe et al., *Ultra-High Bypass Engine Aeroacoustic Study*. No. NASA/CR-2003-212525, 2003.

*Primary Examiner* — Brian Christopher Delrue
(74) *Attorney, Agent, or Firm* — Klarquist Sparkman, LLP

(57) ABSTRACT

A gas turbine engine comprises a fan, a core turbine engine coupled to the fan, a fan case housing the fan and the core turbine engine, a plurality of outlet guide vanes extending between the core turbine engine and the fan case, and an acoustic spacing. Acoustic spacing comprises a distance between the fan and the plurality of outlet guide vanes, and in combination with the use of airfoils with leading edge protectors for both various stages of blades and vanes, the engine effectively reduces noise emissions, enhances aerodynamic efficiency, and improves structural durability.

20 Claims, 10 Drawing Sheets

(52) U.S. Cl.
CPC ............... *F05D 2240/303* (2013.01); *F05D 2260/4031* (2013.01); *F05D 2260/961* (2013.01); *F05D 2300/603* (2013.01)

(56) References Cited

U.S. PATENT DOCUMENTS

| | | | |
|---|---|---|---|
| 5,169,288 A * | 12/1992 | Gliebe | F02C 7/045 |
| | | | 415/119 |
| 5,299,914 A * | 4/1994 | Schilling | F01D 5/141 |
| | | | 416/223 A |
| 6,195,983 B1 * | 3/2001 | Wadia | F01D 5/141 |
| | | | 416/223 R |
| 6,217,283 B1 | 4/2001 | Ravenhall et al. | |
| 6,447,250 B1 | 9/2002 | Corrigan et al. | |
| 7,118,331 B2 * | 10/2006 | Shahpar | F01D 5/142 |
| | | | 415/209.1 |
| 7,374,403 B2 * | 5/2008 | Decker | F01D 5/141 |
| | | | 416/223 R |
| 7,374,404 B2 * | 5/2008 | Schilling | F01D 5/14 |
| | | | 416/241 A |
| 9,540,938 B2 * | 1/2017 | Topol | F01D 17/162 |
| 10,107,191 B2 * | 10/2018 | Gilson | F02C 3/107 |
| 10,247,018 B2 | 4/2019 | Topol et al. | |
| 10,458,426 B2 * | 10/2019 | Wilkin, II | F04D 29/325 |
| 10,584,632 B1 * | 3/2020 | Kannangara | F02C 7/20 |
| 10,677,264 B2 * | 6/2020 | Moniz | F04D 29/324 |
| 10,711,797 B2 * | 7/2020 | Kroger | F04D 29/684 |
| 10,815,886 B2 * | 10/2020 | Kroger | F04D 29/541 |
| 11,199,196 B2 | 12/2021 | Breen | |
| 11,377,958 B2 * | 7/2022 | Lemarchand | F04D 29/663 |
| 12,012,898 B2 * | 6/2024 | Miller | F02K 3/06 |
| 12,158,082 B2 | 12/2024 | Kray et al. | |
| 2006/0228206 A1 * | 10/2006 | Decker | F01D 5/141 |
| | | | 415/1 |
| 2008/0283676 A1 * | 11/2008 | Jain | F02K 3/06 |
| | | | 244/53 B |
| 2009/0082976 A1 * | 3/2009 | Anuzis | G01H 1/006 |
| | | | 702/35 |
| 2015/0044028 A1 * | 2/2015 | Lord | F01D 25/24 |
| | | | 415/115 |
| 2016/0363137 A1 | 12/2016 | Topol et al. | |
| 2017/0022820 A1 | 1/2017 | Joseph et al. | |
| 2017/0184053 A1 | 6/2017 | Harvey et al. | |
| 2017/0298954 A1 * | 10/2017 | Qiu | F04D 29/547 |
| 2017/0314562 A1 | 11/2017 | Rose | |
| 2018/0030926 A1 * | 2/2018 | Eckett | F02K 3/06 |
| 2018/0106274 A1 * | 4/2018 | Moniz | F04D 29/324 |
| 2019/0128123 A1 | 5/2019 | Paruchuri et al. | |
| 2019/0376529 A1 | 12/2019 | Joseph et al. | |
| 2020/0347785 A1 * | 11/2020 | Morin | F02K 1/827 |
| 2020/0400069 A1 * | 12/2020 | Gea Aguilera | B64C 3/16 |
| 2022/0049621 A1 * | 2/2022 | Sawyers-Abbott | F01D 9/041 |
| 2022/0049656 A1 * | 2/2022 | Sawyers-Abbott | F02C 7/045 |
| 2023/0151777 A1 * | 5/2023 | Bifulco | F01D 9/042 |
| | | | 60/226.1 |
| 2024/0151185 A1 * | 5/2024 | Miller | F02K 3/06 |
| 2024/0328431 A1 | 10/2024 | Kray et al. | |
| 2024/0392688 A1 | 11/2024 | Kray et al. | |

* cited by examiner

| Engine | As (320) | c (210) chord length | rr radius ratio | S span | Nb | Nv/Nb | γ stagger angle | BEAL | ASR | FBD |
|---|---|---|---|---|---|---|---|---|---|---|
| #1 | 20.0 | 27 | 0.350 | 25.0 | 16 | 2.6 | 33 | 4.70 | 1.62 | 76.9(#1) |
| #2 | 3.0 | 10 | 0.350 | 24.0 | 20 | 3.0 | 30 | 0.56 | 1.80 | 73.8(#1) |
| #3 | 9.0 | 26 | 0.300 | 30.0 | 24 | 2.1 | 31 | 2.30 | 1.88 | 85.7(#2) |
| #4 | 11.0 | 20 | 0.250 | 26.0 | 22 | 3.0 | 35 | 1.53 | 2.40 | 69.3(#1) |
| #5 | 2.0 | 8 | 0.200 | 28.0 | 22 | 3.0 | 30 | 0.22 | 2.96 | 70.0(#1) |
| #6 | 6.0 | 16 | 0.250 | 30.0 | 20 | 2.5 | 45 | 0.80 | 2.98 | 80.0(#2) |
| #7 | 10.0 | 31 | 0.300 | 28.0 | 26 | 2.0 | 34 | 3.13 | 1.60 | 80.0(#2) |
| #8 | 20.0 | 20 | 0.330 | 30.0 | 14 | 2.9 | 30 | 2.46 | 2.84 | 89.6(#2) |
| #9 | 10.0 | 18 | 0.340 | 32.0 | 22 | 3.0 | 31 | 1.20 | 2.79 | 97.0(#2) |
| #10 | 10.0 | 20 | 0.330 | 35.0 | 16 | 2.8 | 55 | 1.22 | 2.91 | 104.5(#3) |
| #11 | 21.0 | 29 | 0.210 | 38.0 | 16 | 2.5 | 31 | 3.00 | 2.80 | 96.2(#3) |
| #12 | 18.0 | 35 | 0.290 | 40.0 | 20 | 3.0 | 36 | 3.49 | 1.72 | 112.7(#3) |
| #13 | 13.1 | 12.8 | 0.275 | 31.9 | 22 | 2.2 | 43.0 | 0.47 | 12.75 | 88.0(#2) |
| #14 | 13.9 | 12.8 | 0.275 | 31.9 | 22 | 2.2 | 43.0 | 0.47 | 13.53 | 88.0(#2) |
| #15 | 19.5 | 13.5 | 0.210 | 28.0 | 14 | 2.9 | 55.0 | 0.68 | 10.11 | 80.0(#2) |
| #16 | 16.5 | 18.5 | 0.270 | 37.2 | 16 | 2.3 | 53.0 | 0.95 | 7.73 | 101.9(#3) |
| #17 | 16.5 | 18.5 | 0.270 | 32.0 | 16 | 2.3 | 53.0 | 1.10 | 6.65 | 87.7(#2) |
| #18 | 14.5 | 12.8 | 0.280 | 31.4 | 20 | 3.0 | 43.0 | 0.53 | 9.12 | 87.2(#2) |
| #19 | 10.3 | 12.8 | 0.275 | 28.0 | 22 | 2.2 | 43.0 | 0.54 | 8.80 | 77.2(#1) |
| #20 | 5.5 | 14.0 | 0.275 | 29.0 | 22 | 2.2 | 43.0 | 0.62 | 4.07 | 80.0(#2) |
| #21 | 3.8 | 11.0 | 0.275 | 33.0 | 22 | 2.2 | 43.0 | 0.34 | 5.18 | 91.0(#2) |
| #22 | 14.0 | 12.0 | 0.275 | 32.0 | 22 | 2.2 | 43.0 | 0.41 | 15.55 | 88.3(#2) |

FIG. 4

GAS TURBINE ENGINE WITH ACOUSTIC SPACING OF THE FAN BLADES AND OUTLET GUIDE VANES

CROSS REFERENCE TO RELATED APPLICATION

This application is a continuation-in-part of U.S. application Ser. No. 18/744,069, filed Jun. 14, 2024. The prior application is incorporated herein by reference in its entirety.

FIELD

This application generally relates to gas turbine engines for aircraft and, more particularly, to geared gas turbine engines with an acoustic spacing and other noise-reducing architecture.

BACKGROUND

A gas turbine engine for an aircraft typically includes a fan, a compressor, a combustion section, a turbine section, and a nozzle section. The fan propels air entering the gas turbine engine into the compressor. The compressor increases the pressure of the air as the air is routed into the combustion section. The combustion section combusts the pressurized air with fuel to produce combustion gases. The combustion gases are routed through the turbine section and exit the gas turbine engine via the nozzle section, thereby producing thrust.

BRIEF DESCRIPTION OF THE DRAWINGS

FIG. 4 shows exemplary acoustic spacing ratios for exemplary gas turbine engines.

DETAILED DESCRIPTION

Figure 1:
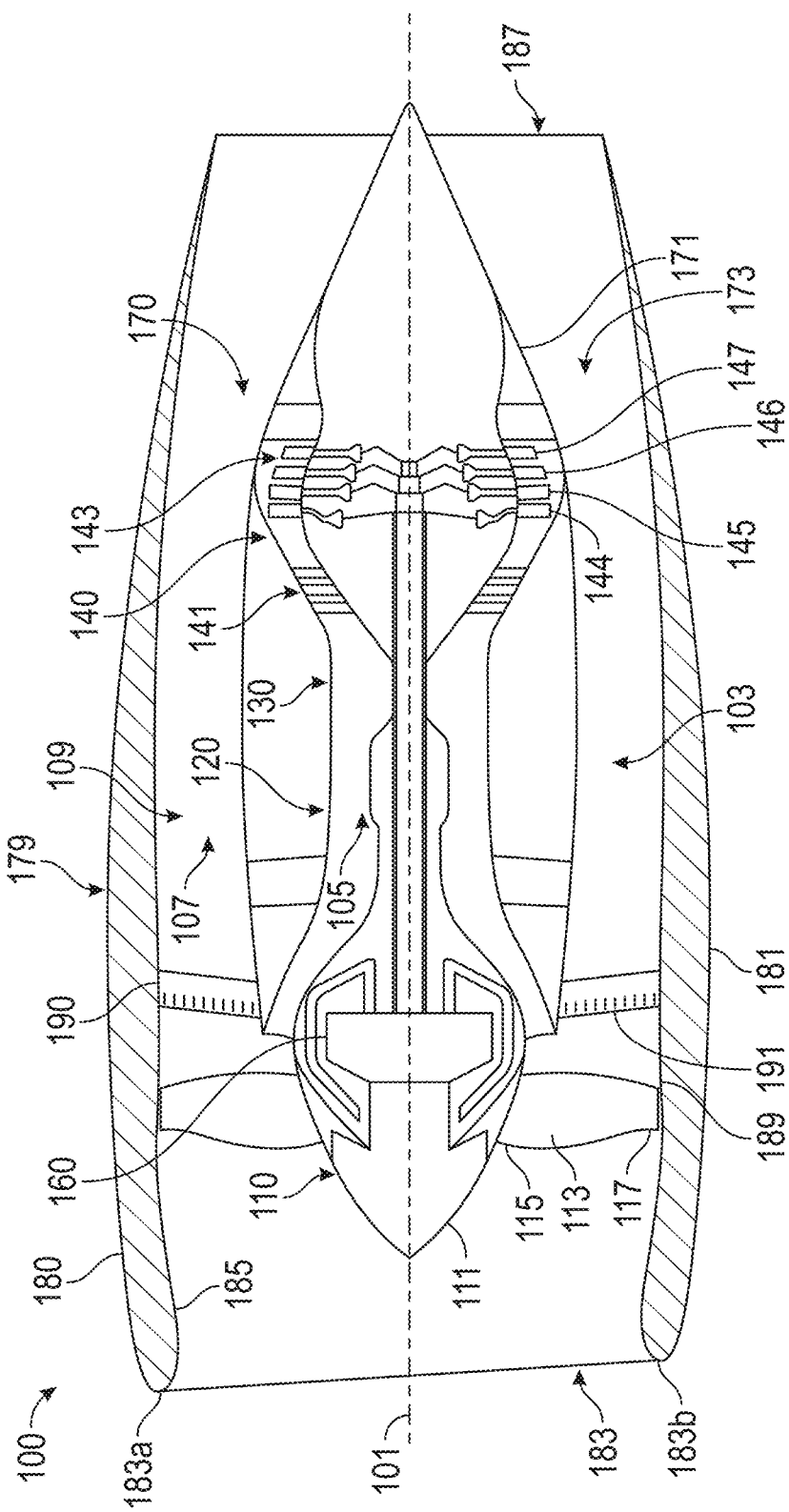
FIG. 1 shows a schematic view of an exemplary gas turbine engine, according to one example.

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Features and characteristics described in conjunction with a particular aspect, embodiment or example are to be understood to be applicable to any other aspect, embodiment or example described herein unless incompatible therewith. A II of the features disclosed in this specification (including any accompanying claims, abstract and drawings), and/or all of the steps of any method or process so disclosed, may be combined in any combination, except combinations where at least some of such features and/or steps are mutually exclusive.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are relatively discernable by one of ordinary skill in the art.

As used herein, the terms "a", "an", and "at least one" encompass one or more of the specified element. That is, if two of a particular element are present, one of these elements is also present and thus "an" element is present. The terms "a plurality of" and "plural" mean two or more of the specified element. As used herein, the term "and/or" used between the last two of a list of elements means any one or more of the listed elements. For example, the phrase "A, B, and/or C" means "A," "B," "C," "A and B," "A and C," "B and C" or "A, B and C." As used herein, the term "coupled" generally means physically, chemically, electrically, magnetically, or otherwise coupled or linked and does not exclude the presence of intermediate elements between the coupled items absent specific contrary language.

As used herein in this application and in the claims, the term "OGV" refers to an outlet guide vane of the gas turbine engine.

Aspects of the disclosure herein are directed to a plurality of composite airfoil stages. For purposes of illustration, the present disclosure will be described with respect to the plurality of composite airfoil stages within an engine being a first stage of airfoils in the form of fan blades and a second stage of airfoils immediately downstream the first stage of airfoils as an OGV. While fan blades and OGVs are illustrated, it should be understood that any consecutive sets of stages are contemplated. Further, it will be understood, that aspects of the disclosure herein are not so limited and may have general applicability within an engine, including compressors, as well as in non-aircraft applications, such as other mobile applications and non-mobile industrial, commercial, and residential applications.

Reference will now be made in detail to composite fan blades and composite OGVs, one or more examples of which are illustrated in the accompanying drawings. The detailed description uses numerical and letter designations to refer to features in the drawings.

The term "composite," as used herein is, is indicative of a material that does not include metal material. A composite can be a combination of at least two or more non-metallic elements or materials. Examples of a composite material can be, but not limited to, a polymer matrix composite (PMC), a ceramic matrix composite (CMC), carbon fibers, a polymeric resin, a thermoplastic, bismaleimide (BMI), a polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al2O_3 2SiO_2$), as well as glassy aluminosilicates.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing, to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, with regard to a turbine engine, forward refers to a position closer to an engine inlet and aft refers to a position closer to an engine nozzle or exhaust.

The term "fluid" may be a gas or a liquid, or multi-phase. The term "fluid communication" means that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Leading length or "LL" as used herein refers to a length between a leading edge of the airfoil and an edge between a leading edge protector and a portion of the airfoil.

First leading length or "FLL" as used herein refers to the leading length of a first stage of airfoils.

Second leading length or "SLL" as used herein refers to the leading length of a second stage of airfoils immediately downstream from the first stage of airfoils.

Chord Length, or "CL" or "c," as used herein refers to a length between a leading edge of the airfoil and a trailing edge of the airfoil. When used as "CL," the length refers to a length taken at any position from 20% to 80% span. When used as "c," the length refers to a length taken at 75% span, i.e., "c" is the "CL" at 75% span.

First chord length or "FCL" as used herein refers to the chord length of the first stage of airfoils.

Second chord length or "SCL" as used herein refers to the chord length of the second stage of airfoils.

Airfoil protection factor or "APF" as used herein refers to a relationship in the form of a ratio of the leading length to the chord length of the airfoil. As more protection is provided for any given airfoil, the leading length increases and in turn so does the APF.

Stage performance factor or "SPF" as used herein refers to a relationship in the form of a ratio of the airfoil protection factor for the first stage of airfoils, or "APF1" to the airfoil protection factor for the second stage of airfoils, or "APF2".

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Gas turbine engines generate significant noise during operation and it is desirable to reduce the amount of noise generated. The degree of noise generated is a function of, among other things, the relative positioning of components of the engine. Modifications to the engine's architecture, such as the relative position of a vane downstream of a rotating part and the airfoil characteristics of the vane, can have a significant impact on the noise generated. However, changes made to reduce noise can also negatively impact performance in terms of weight, drag, etc. One cannot simply change relative positions or airfoil characteristics without imposing significant penalties on the engine drag, weight, etc. Thus, there are difficult trade-offs to be made between, on the one hand, reducing the noise envelope to satisfy more stringent community noise requirements and, on the other hand, not negating performance improvements (weight, drag, specific fuel consumption, etc.) for the sake of reducing the noise generated at take-off. Conventional methods of reducing gas turbine engine noise, such as varying fan pressure ratio ("FPR"), can be insufficient to meet increasingly stringent community noise requirements.

The inventors of the present disclosure have found that a quieter gas turbine engine can be achieved by providing a specific range of acoustic spacing between the fan blades and OGVs in combination with specific ranges of certain other features of the engine architecture. Such a configuration of the fan blades and OGVs may maintain a desired overall propulsive efficiency for the turbofan engine while desirably reducing the noise generated by the engine. As part of the process of determining this acoustic spacing, the inventors discovered that a relationship between a ratio of the acoustic spacing and a blade effective acoustic length, which is determined based on particular features of fan (eg., chord length, span, stagger angle, radius ratio, number of blades), can provide desirable improvements in noise reductions for the gas turbine engine.

Additionally, the inventors have further found that adjustments to acoustic spacing, as described herein, significantly influences the aerodynamic forces acting on the fan blades and the OGVs, as well as downstream blades and vanes (e.g., compressor blades and vanes). In particular, acoustic spacing adjustments can have unintended consequences on blades and vanes, as the altered flow dynamics can shift the aerodynamic loading and stress distribution across these components.

For the fan blades, increased acoustic spacing can lead to changes in the flow patterns around the trailing edge, potentially increasing the aerodynamic drag and altering the pressure distribution along the blade surface. This can result in higher bending moments and stresses at the blade root, particularly for rotating blades that experience significant centrifugal forces during operation. For the OGVs, the increased spacing can reduce the direct impact of the wake but may also introduce new challenges, such as increased turbulence in the bypass stream or altered flow angles, which can affect the aerodynamic efficiency and structural loading of the vanes. These changes necessitate careful design considerations to ensure that the airfoils can withstand the modified forces without compromising performance or durability.

The stage performance factor (SPF), described in detail below, unexpectedly helps mitigate these forces by improving the protective coverage of the leading edge protectors across successive airfoil stages. The SPF, defined as the ratio of the airfoil protection factor (APF) of the fan blades to the APF of the OGVs, ensures that the protective coverage is tailored to the specific aerodynamic and structural requirements of each stage. For the fan blades, which experience higher kinetic energy impacts and centrifugal forces, the SPF ensures that the leading edge protectors provide sufficient coverage to reduce the bending moments and stresses caused by the altered flow dynamics. This protective coverage not only shields the blades from foreign object damage but also helps maintain their structural integrity under the increased aerodynamic loading.

For the OGVs, the SPF ensures that the protective coverage is sufficient to account for their downstream position. By tailoring the coverage to the specific aerodynamic forces acting on the vanes, the SPF can reduce the impact of turbulence and pressure fluctuations caused by the modified wake dynamics. The SPF also helps balance the aerodynamic loading between the fan blades and the OGVs, ensuring that the changes in acoustic spacing do not disproportionately affect one stage over the other.

Unexpectedly, the SPF provides a framework for harmonizing the protective coverage with the aerodynamic forces introduced by acoustic spacing changes. By maintaining the SPF within the ranges discussed below, the design ensures that the airfoils can withstand the modified forces without compromising noise reduction, thrust efficiency, or structural durability.

FIG. 1 is a schematic cross-section view of a gas turbine engine 100 configured to produce thrust or power for an aircraft. In some examples, the gas turbine engine 100 can be an aircraft engine configured to produce at least 17,500 horsepower of thrust. In other examples, the gas turbine engine 100 can be an aircraft engine configured to produce between 1 and 17,500 horsepower of thrust.

The gas turbine engine 100 defines a central longitudinal axis 101 extending between a forward portion and a rear portion of the gas turbine engine 100. The gas turbine engine 100 includes a core turbine engine 103 centered about the central longitudinal axis 101, a fan 110 disposed forward of the core turbine engine 103, a nacelle 179 which includes a fan case 180 encasing or housing the fan 110, and outlet guide vanes ("OGVs") 190 disposed aft of the fan 110 and extending radially between the core turbine engine 103 and the fan case 180. FIG. 1 illustrates a fan case 180 generally extending to the aft end of the gas turbine engine; however, in other examples, the length and/or relative position of the fan case to the gas turbine engine (forward and/or aft) may vary.

The fan 110 is configured to propel air through the gas turbine engine 100. During the operation of the gas turbine engine 100, the fan 110 draws a first portion of the air 105 into the core turbine engine 103. The fan 110 draws a second portion of the air 107 into a bypass stream 109 disposed outside the core turbine engine 103. The fan 110 comprises a fan disk 111 and a plurality of fan blades 113 that radially extend from the fan disk 111. However, other examples of the fan 110 can comprise additional or alternative components.

The fan disk 111 is centered about and is configured to rotate about the central longitudinal axis 101. The fan disk 111 comprises a front hub that can be aerodynamically contoured to promote airflow through the fan 110.

The plurality of fan blades 113 are coupled to and uniformly spaced around the circumference of the fan disk 111. Each of the plurality of fan blades 113 comprises a fan blade root 115, at which the fan blade 113 is coupled to the fan disk 111, and a fan blade tip 117 disposed opposite the fan blade root 115. The fan blade root 115 is oriented radially inwards towards the central longitudinal axis 101, while the fan blade tip 117 is oriented radially outward away from the central longitudinal axis 101. The distance between the fan blade root 115 and the fan blade tip 117 defines a span or a length of the fan blade 113.

In some examples, the number ($N_b$) of fan blades 113 can desirably be between 14 and 26 fan blades. In other examples, the plurality of fan blades 113 can number between 20 and 24 fan blades, 20 and 22 fan blades, or 22 fan blades.

Characteristics of the fan 110 include the fan pressure ratio ("FPR"). FPR is defined as the ratio of the pressure of the air entering fan 110 from an upstream direction to the pressure of the air exiting the fan 110 in a downstream direction. In some examples, the FPR of the gas turbine engine 100 can be greater than or equal to 1.25 and less than or equal to 1.55, or greater than or equal to 1.30 and less than or equal to 1.45. In other examples, the FPR can be greater than 1.30 or 1.35, and equal to or less than 1.40.

During operation, the core turbine engine 103 generates mechanical energy for rotating the fan 110. The core turbine engine 103, disposed aft of the fan 110, includes a compressor section 120, a combustion section 130, a turbine section 140, a drive shaft system 150, a gearbox assembly 160, and a nozzle section 170. However, other examples of the gas turbine engine 100 can comprise additional or alternative components.

During operation, the compressor section 120 compresses or increases the pressure of the air 105 propelled into the core turbine engine 103 by the fan 110. The compressor section 120 is typically the forward-most component of the core turbine engine 103 and thus can be disposed directly aft of the fan 110. In some examples, the compressor section 120 comprises one or more stages of a low-pressure compressor and one or more stages of a high-pressure compressor.

The combustion section 130, which is disposed aft of the compressor section 120, combusts the air pressurized by the compressor section 120 with fuel to produce combustion gases.

During operation, the turbine section 140 generates power by extracting thermal and kinetic energy from the combustion gases produced by the combustion section 130. The turbine section 140 produces power in any suitable range sufficient to power the fan 110. The turbine section 140 comprises a high pressure turbine 141 and a low pressure turbine 143. The high pressure turbine 141, disposed aft of the combustion section 130, extracts energy from the combustion gases leaving the combustion section 130. The low pressure turbine 143 is disposed aft of the high pressure turbine 141 and extracts energy from combustion gases leaving the high pressure turbine 141.

In some examples, the low pressure turbine 143 can comprise a plurality of low pressure turbine stages 144, 145, 146, 147. In the illustrated example, the low pressure turbine 143 can be a four-stage low pressure turbine comprising, from fore to aft, a first low pressure turbine stage 144, a second low pressure turbine stage 145, a third low pressure turbine stage 146, and a fourth low pressure turbine stage 147. In some examples, the low pressure turbine comprises three or more stages, such as three stages, four stages, or five stages. Including additional low pressure turbine stages can desirably increase the amount of work extracted from the combustion gases and in some examples, the low pressure turbine comprises four or more stages, such as four stages or five stages.

The drive shaft system 150 can include a high pressure shaft system that couples the high pressure turbine 141 to the compressor section 120 and a low pressure shaft system connecting the low pressure turbine 143 to the fan 110, thereby allowing the turbine section 140 to power the fan 110 and the compressor section 120. In some examples, the drive shaft system 150 can couple the high pressure turbine 141 to the high pressure compressor (not pictured) and can couple the low pressure turbine 143 to the low pressure compressor (not pictured) and the fan 110. In some examples, the drive shaft system 150 can comprise a plurality of concentric shafts configured to rotate about and extending along the central longitudinal axis 101 (also referred to herein as the engine centerline).

The gearbox assembly 160 couples the turbine section 140 to the fan 110. In some examples, the gearbox assembly 160 can be configured to receive power from a plurality of sources. In some examples, the gearbox assembly 160 can be configured to receive power from each of the low pressure turbine stages 144, 145, 146, 147. The gearbox assembly 160 can be configured to drive or output the power to the fan 110, thereby allowing the low pressure turbine 143 and the fan 110 to rotate at improved rotational speeds without affecting the operation of the other components. In some of these examples, the gearbox assembly 160 can comprise one or more epicyclic gearboxes or any other suitable gear train configured to couple the turbine section 140 to the fan 110.

Once the combustion gases have exited the turbine section 140, the combustion gases pass through the nozzle section 170 and exit the gas turbine engine 100. In some examples, the nozzle section can comprise two co-annular nozzles: a combustion nozzle 171 and a fan nozzle 173. The combustion nozzle 171 is the centermost co-annular nozzle configured to allow combustion gases to exit the core turbine engine 103. The fan nozzle 173 is the outermost co-annular nozzle configured to allow air to exit the bypass stream 109.

The fan case 180 houses or encloses the fan 110. The fan case 180 comprises a hollow shell 181, an inlet 183, a lip 185, an outlet 187, and an acoustic treatment 189. However, other examples of the fan case 180 can include additional or alternative components.

The hollow shell 181 protects and/or insulates the fan 110. The hollow shell 181 extends along the central longitudinal axis 101 from the inlet 183 to the outlet 187. The hollow shell 181 is sized to encompass the core turbine engine 103 fully (as shown), or partially such that the inlet 183 is disposed forward of the fan 110 and the outlet 187 is disposed aft of the OGVs 190. The hollow shell 181 features a streamlined shape to improve aerodynamic performance. In some examples, the hollow shell 181 can be streamlined or tapered such that the inlet 183 or a forward end portion of the hollow shell 181 has a wider diameter than the outlet 187 or an aft end portion of the hollow shell 181.

During operation, the inlet 183 allows the passage of air into the gas turbine engine 100. The inlet 183 comprises a circular, forward-facing opening in the hollow shell 181 centered about the central longitudinal axis 101. In some examples, the inlet 183 can be angled relative to the central longitudinal axis 101 such that a top portion 183a of the inlet 183, i.e., a portion of the inlet 183 at a twelve o'clock position when the gas turbine engine 100 is mounted to an aircraft, extends forward of a bottom portion 183b of the inlet 183 at a six o'clock position, as shown.

The inlet 183 and the hollow shell 181 define a lip 185 extending along the circumference of the inlet 183 at the forward-most edge portion of the hollow shell 181. The lip 185 is contoured or curved to improve aerodynamic performance and/or reduce flow separation. For example, the lip 185 can be contoured such that the hollow shell 181 forms an hourglass shape (in cross-section) forward of the fan 110.

During operation, the outlet 187 allows air and combustion gases to exit the fan case 180. The outlet 187 comprises a circular, aft-facing opening in the hollow shell 181. The outlet 187 can be centered about and orthogonal to the central longitudinal axis 101 of the gas turbine engine 100.

The acoustic treatment 189 can be provided to acoustically insulate the fan case 180 during operation, thereby desirably reducing the amount of noise emitted by the gas turbine engine 100. The acoustic treatment 189 can comprise a multi-layered liner disposed on a circumferential interior surface of the hollow shell 181. When disposed on the circumferential interior surface of the hollow shell 181, the multi-layered liner can comprise a radially innermost porous layer, an intermediate partitioned layer, and a radially outermost impervious layer. In some examples, the acoustic treatment 189 is disposed on the portion of the interior surface of the hollow shell 181 extending between the fan 110 and the OGVs 190.

The OGVs 190 couple the fan case 180 to the core turbine engine 103 and steer the air 107 in the bypass stream 109 towards the fan nozzle 173 and the outlet 187. The OGVs 190 extend radially outwards to the circumferential interior surface of the hollow shell 181 of the fan case 180, and can be disposed in a radially uniform fashion around the circumference of the core turbine engine 103. In some examples, the OGVs 190 can be swept such that a tip or a radially outward end portion of each of the OGVs 190 is angled towards the aft end of the gas turbine engine 100.

In some examples, each of the OGVs comprises a serrated leading edge 191. The serrated leading edge 191 can comprise a waveform or a serration extending radially along the edge of each of the OGVs 190. The waves or serrations are configured to reduce the noise generated by the air in the bypass stream 109 passing over the OGVs 190.

The example gas turbine engine 100 depicted in FIG. 1 should not be construed to preclude other suitable configurations of gas turbine engines. It should also be appreciated that aspects of the present disclosure can be incorporated into other suitable gas turbine engines used in aircraft.

Figure 2:
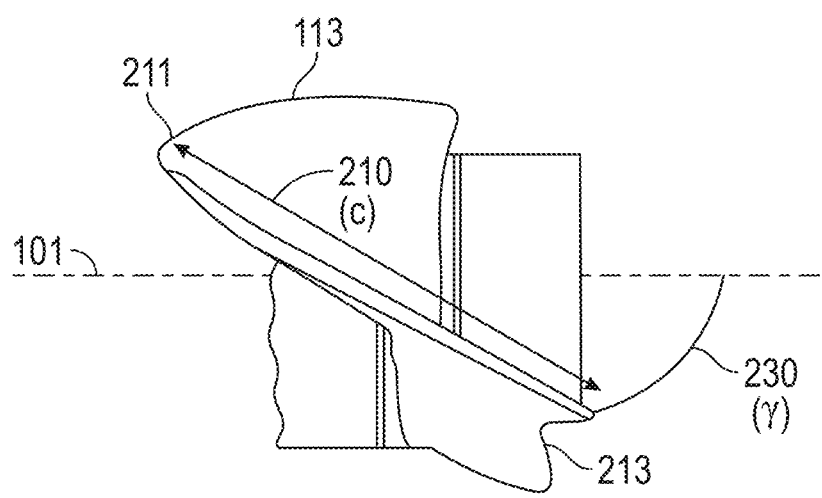
FIG. 2 shows a top view of a fan blade for a gas turbine engine, according to one example.
Figure 3:
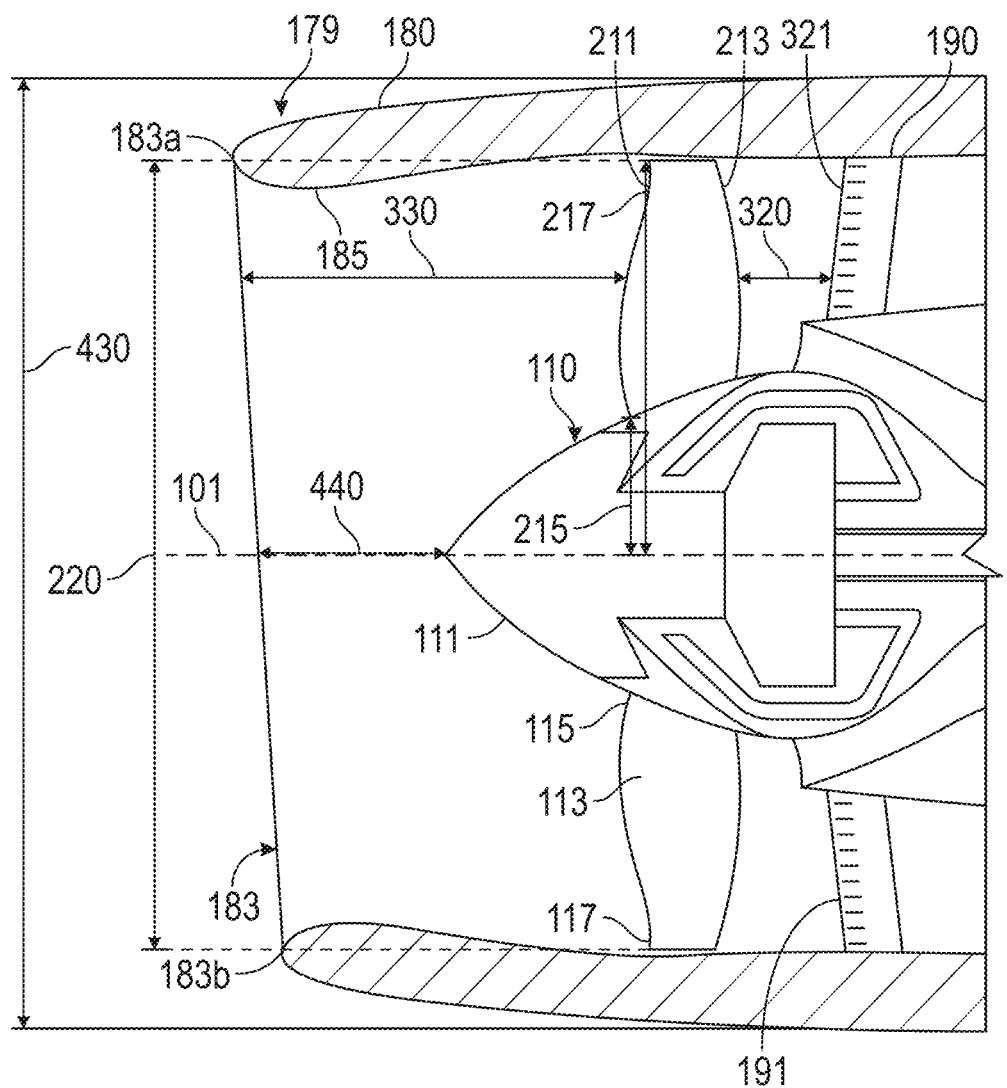
FIG. 3 is a partial view of a gas turbine engine with an acoustic spacing, according to one example.

FIG. 2 shows a top view of a fan blade 113 and FIG. 3 shows a view of the fan 110. Each of the fan blades 113 have a blade solidity (c/s). Each fan blade has a radial span extending from a root at a 0% span position to a tip at a 100% span position. The span S of a blade is the difference in the radius of a leading edge at the tip 217 and the radius of the leading edge of the root at the hub 215.

Blade solidity is defined as the ratio of chord length (c) 210 to the circumferential spacing (s) between the fan blade 113 and a nearest adjacent fan blade 113, measured at a 75% span position of the fan blade 113. As shown in FIG. 2, the chord length 210 is a straight-line distance between a leading edge 211 and a trailing edge 213 of the fan blade. The spacing (s) between adjacent fan blades is calculated by multiplying a fan diameter by a and dividing the product by the number ($N_b$) of fan blades. In a first set of examples, enhanced performance can be observed when the blade solidity of the gas turbine engine is greater than or equal to 0.8 and less than or equal to 2. In a second set of examples, enhanced performance can be observed when the blade solidity is greater than or equal to 0.8 and less than or equal to 1.5. In a third set of examples, enhanced performance can be observed when the blade solidity is greater than or equal to 1 and less than or equal to 2. In a fourth set of examples, enhanced performance can be observed when the blade solidity is greater than or equal to 1.25 and less than or equal to 1.75.

In addition, the fan preferably has a low radius ratio (rr), which is a ratio of the radius of the leading edge of the root at the hub 215 to the radius 217 of a blade tip or 100% span position of a blade, both measured from the central longitudinal axis 101 at the leading edge 211 of fan blades as shown in FIG. 3. In some examples, the radius ratio (rr) is 0.2 to 0.35, in other examples, the radius ratio (rr) is 0.25 to 0.3.

Each of the plurality of fan blades 113 defines a stagger angle (γ) 230. The stagger angle 230 is an angle between the central longitudinal axis 101 and a chord line (along which the chord length is measured) as measured at the 75% span position of the respective fan blade. In some examples, the stagger angle 230 can range from 30 degrees to 75 degrees. In other examples, the stagger angle 230 can range from 30 degrees to 60 degrees.

As discussed above, the inventors, during the course of engine design, sought to improve engine performance characteristics including thrust efficiency, installation, engine length from inlet to nozzle, fan case and core size (affecting installed drag) and staying within a maximum weight budget. In one example, the OGVs were mounted to a fan frame, along with the fan and the gearbox assembly. This meant that the OGVs would be located relatively close to the fan so that a more compact engine and efficient (strength/weight) load bearing fan frame could be realized. But the resulting proximity of the fan to the OGVs was found to generate more noise than desired. From an acoustics standpoint, one instead wants to space the fan and the OGVs further apart from each other, generally speaking. But this change can impact the placement of other subsystems and adversely affect overall performance, e.g., gearbox assembly placement and resulting load balances associated with the fan frame, fan frame length, overturning moments, and overall weight of a nacelle, either the fan case type illustrated in FIG. 1 or an engine with a short fan case, such as the engines illustrated in FIGS. 3 and 4, and described in paragraphs [0083]-[0092] of U.S. Patent Application Publication No. 2022/0042461, which have a fan nozzle terminating well upstream of the core nozzle located downstream of the low pressure turbine. As each change impacts other systems, there is a need to understand what combination, or extent of modifications, provide improved acoustic performance without unacceptably negatively impacting other aspects of the engine architecture, as mentioned. Thus, it was exceedingly more challenging to determine how to implement changes without affecting other aspects of the architecture upon which increased performance was dependent upon, than simply making modifications to reduce the noise generated.

Taking these things in mind, the inventors unexpectedly discovered that gas turbine engines, such as the gas turbine engine 100 of FIG. 1, embodying the below-described characteristics have improved acoustic characteristics, but without imposing severe and unacceptable penalties on other aspects of the architecture or engine aero-performance. For example, the inventors found that gas turbine engines with desirable placement of OGVs, such as the OGVs 190 of FIG. 1, may result in the maintaining of or improving upon a desired propulsive efficiency, while improving the turbofan engine's acoustic properties.

FIG. 3 is a schematic, partial cross-sectional view of a gas turbine engine in accordance with the disclosure. For gas turbine engines that have a blade solidity greater than or equal to 0.8 and less than or equal to 2, it has been found that such engines are characterized by a blade effective acoustic length (BEAL) that can be used, as explained below, to determine a range of modifications and/or adjustments that provide improved acoustic performance. The BEAL is determined from (1) below:

$$BEAL = \frac{2c^2}{S(1-rr)N_b}\cos(\gamma) \qquad (1)$$

where c is the chord length at 75% span, rr is the radius ratio of the fan, S is the full span of the fan blade (i.e, as measured at a 100% span position at the blade leading edge), γ is the stagger angle, and $N_b$ is the number of fan blades.

Exemplary ranges for the elements of the gas turbine engines described herein are provided below in Table 1. As shown in Table 1, for some variables, the exemplary ranges vary depending on a corresponding range of fan blade diameter. For example, the fan blade diameter (FBD) for three different ranges, FBD #1, FBD #2, and FBD #3 are shown below.

65≤FBD #1<80 inches
80≤FBD #2<95 inches
95≤FBD #3<115 inches

TABLE 1

| Symbol | Description | Exemplary Ranges for Use with BEAL |
|---|---|---|
| C | Chord length at 75% span position (ranges based on FBD) | 5" to 28" (for FBD #1)<br>6" to 33" (for FBD#2)<br>7" to 35" (for FBD#3) |
| S | Span of fan blade at 100% span position (ranges based on FBD) | 24" to 30" (for FBD#1)<br>28" to 36" (for FBD#2)<br>32" to 40" (for FBD#3) |
| rr | Radius ratio (range) | 0.2 to 0.35 |
| Nv | Number of OGVs (ranges) | 1.5 Nb to 3 Nb, 1.8 Nb to 2.4 Nb, 2.0 Nb to 2.5 Nb, or 2.2 Nb to 2.6 Nb |
| γ | Stagger angle (ranges) | 30°-75° or 30°-60° |
| $N_b$ | Number of fan blades (ranges) | 14-26, 20-24, 20-22, or 22 |

As shown in FIG. 3, an acoustic spacing 320 (As) is a length, measured parallel to the central longitudinal axis 101, that extends from the trailing edge 213 of the fan blade 113 to the leading edge 321 of a corresponding one of the OGVs 190. A n inlet length 330 is an axial distance between the leading edge 211 of a fan blade 113 and the inlet 183. The acoustic spacing 320, chord length 210 (FIG. 2), and inlet length 330 are measured at the 75% span position of the fan blade 113.

An acoustic spacing ratio (ASR) can be determined using the BEAL, ratio of Nv/Nb, and the acoustic spacing (As) as shown below in (2):

$$ASR = \frac{1}{\left(\frac{Nv}{Nb}\right)} \cdot \frac{As}{BEAL} \qquad (2)$$

Nv is the number of vanes of the OGVs. In some examples, the number of OGVs (Nv) are at least twice the number of fan blades (Nb). In some examples, a ratio of the number of OGVs to the number of fan blades (Nv/Nb) is 2.0 to 2.5, or 2.2 to 2.6. In other examples, the ratio of the number of OGVs to the number of fan blades (Nv/Nb) is 1.5 to 3.0 or 1.8 to 2.4.

In some embodiments, the ratio of a vanes to blades can be less than 1:1. For example, in particular embodiments, the engine includes twelve (12) fan blades and ten (10) vanes.

Varying the acoustic spacing ratio can impact engine performance in the following ways. For example, gas turbine engines with higher acoustic spacing ratios can emit less noise. And gas turbine engines with lower acoustic spacing ratios can reduce the size of the gas turbine engines, thereby beneficially reducing fuel consumption and emissions generated by the gas turbine engines.

Gas turbine engines with acoustic spacing ratios from 1.4 to 3.2 exhibited the sought-after balance (discussed above) between noise emissions and engine size, thereby featuring enhanced performance over conventional gas turbine engines. For example, enhanced results can be achieved with acoustic spacing ratios from 1.5 to 16, including the lower ratios such as 1.5 to 3.1 or 1.6 to 3, 1.6 to 2.4 or 2.0 to 3, and higher ratios such as 4 to 14 or 6.6 to 13.5, depending on a desired acoustic spacing and fan blade design.

As shown in FIGS. 1 and 3, the axial extent of the inlet 183 can vary, e.g., between a twelve o'clock position and a six o'clock position. For this type of fan case 180, the inlet length 330 is the average the axial distance between the leading edge 211 of the fan blade 113 and the top portion 183a of the inlet 183, and the axial distance between the leading edge 211 the fan blades 113 and the bottom portion 183b of the inlet 183, i.e., the inlet length 330 is distance from the leading edge 211 of the fan blade 113 and the inlet 183, as measured at the 75% span position of the fan blade 113.

In one set of examples, the fan diameter 220 ranges from 52 in. to 120 in. In another set of examples, the fan diameter 220 ranges from 75 in. to 105 in. In additional sets of examples, the fan diameter 220 ranges from 70 in. to 80 in, 80 in. to 95 in., or 95 in. to 105 in. An inlet length ratio is the ratio of the inlet length 330 to the fan diameter 220. Enhanced performance of gas turbine engines 100 can be achieved with inlet length ratios from 0.15 to 0.5. Gas turbine engines 100 with inlet length ratios less than or equal to 0.5 can desirably feature enhanced performance compared to conventional gas turbine engines 100 due to reduced fan case length, reduced drag, and reduced fan distortion. In another set of examples, enhanced performance can unexpectedly be achieved with inlet length ratios from 0.15 to 0.4. In further examples, enhanced performance can be achieved with inlet length ratios from 0.15 to 0.3.

In another set of examples, an inlet-to-nacelle (ITN) ratio is defined as a ratio of the inlet length 330 to a nacelle outer diameter 430, which is the largest diameter of the nacelle 179. Enhanced performance of gas turbine engines 100 can be achieved with ITN ratios from 0.23 to 0.35. Gas turbine engines 100 with ITN ratios can desirably feature enhanced performance compared to conventional gas turbine engines 100 due to reduced fan case length, reduced drag, and reduced fan distortion. In another set of examples, enhanced performance can unexpectedly be achieved with ITN ratios from 0.27 to 0.35, and from 0.30 to 0.33.

FIG. 3 illustrates a disk spacing length 440, which is the distance between a forwardmost end of the fan disk 111 and the intersection of the inlet taken along the engine centerline (i.e., central longitudinal axis 101). A disk-to-blade diametric (DBD) ratio is the ratio of the disk spacing length 440 to the fan diameter 220. The inventors of the present disclosure have found that enhanced performance of gas turbine engines 100 can be achieved with disk-to-blade diametric ratios that are less than or equal to 0.6, and in some examples with disk-to-blade diametric ratios that range from 0.09 to 0.59, 0.15 to 0.35, and 0.19 to 0.27. Gas turbine engines 100 with disk-to-blade diametric ratios in these ranges can desirably feature enhanced performance compared to conventional gas turbine engines 100 due to reduced drag and reduced fan distortion. Further benefits have been identified when a gas turbine engine is configured to have a DBD ratio in the ranges disclosed above, in combination with an ITN ratio in the ranges disclosed above. For example, a gas turbine engine can have a DBD ratio of 0.22 and an ITN ratio of 0.27, both of which meet at least one of the stated desirable ranges for the DBD and ITN ratios. It should be noted that a gas turbine engine can be configured to meet any combination of the disclosed DBD ratios and the disclosed ITN ratios.

In another set of examples, enhanced performance can unexpectedly be achieved with disk-to-nacelle ratios below 0.47. A disk-to-nacelle diametric (DND) ratio is the ratio of the disk spacing length 440 to the nacelle diameter 430. The inventors of the present disclosure have found that enhanced performance of gas turbine engines 100 can be achieved with disk-to-nacelle diametric ratios that range from 0.07 to 0.47, 0.15 to 0.35, and 0.19 to 0.27. Gas turbine engines 100 with disk-to-nacelle diametric ratios in these ranges can desirably feature enhanced performance compared to conventional gas turbine engines 100 due to reduced drag and reduced fan distortion. Further benefits have been identified when a gas turbine engine is configured to have a DND ratio in the ranges disclosed above, in combination with an ITN ratio in the ranges disclosed above. For example, a gas turbine engine can have a DND ratio of 0.21 and an ITN ratio of 0.27, both of which meet at least one of the stated desirable ranges for the DND and ITN ratios. It should be noted that a gas turbine engine can be configured to meet any combination of the disclosed DND ratios and the disclosed ITN ratios.

In another set of examples, enhanced performance can unexpectedly be achieved with disk-to-inlet length (DIL) ratios within the range 0.30 to 0.80. A disk-to-inlet ratio is the ratio of the disk spacing length 440 to the inlet length 330. The inventors of the present disclosure have found that enhanced performance of gas turbine engines 100 can be also be achieved with disk-to-inlet ratios that range from 0.4 to 0.8, 0.4 to 0.7, and 0.45 to 0.67. Gas turbine engines 100 with disk-to-inlet ratios in these ranges can desirably feature enhanced performance compared to conventional gas turbine engines 100 due to reduced drag and reduced fan distortion. Further benefits have been identified when a gas turbine engine is configured to have a DIL ratio in the ranges disclosed above, in combination with an ITN ratio in the ranges disclosed above. For example, a gas turbine engine can have a DIL ratio of 0.49 and an ITN ratio of 0.27, both of which meet at least one of the stated desirable ranges for the DIL and ITN ratios. It should be noted that a gas turbine engine can be configured to meet any combination of the disclosed DIL ratios and the disclosed ITN ratios.

Table 2 below illustrates exemplary engines with the disk-to-blade diametric (DBD) ratios, disk-to-nacelle diametric (DND) ratios, and disk-to-inlet (DIL) ratios in the ranges disclosed herein. For each exemplary gas turbine engine disclosed in Table 2, the gas turbine engine has an ITN ratio that is 0.23 to 0.35.

TABLE 2

| Engine | fan-disk spacing length (in) 440 | fan diameter (in) 220 | nacelle diameter (in) 430 | inlet length (in) 330 | DBD Ratio | DND Ratio | DIL Ratio |
|---|---|---|---|---|---|---|---|
| 1 | 24 | 46 | 64 | 36 | 0.52 | 0.38 | 0.67 |
| 2 | 26 | 53 | 75 | 37 | 0.49 | 0.35 | 0.70 |
| 3 | 35 | 61 | 87 | 48 | 0.57 | 0.40 | 0.73 |
| 4 | 24 | 69 | 96 | 37 | 0.35 | 0.25 | 0.65 |
| 5 | 21 | 78 | 102 | 37 | 0.27 | 0.21 | 0.57 |
| 6 | 22 | 78 | 104 | 39 | 0.28 | 0.21 | 0.56 |
| 7 | 48 | 93 | 115 | 63 | 0.52 | 0.42 | 0.76 |
| 8 | 17 | 88 | 116 | 35 | 0.19 | 0.15 | 0.49 |
| 9 | 21 | 80 | 107 | 32 | 0.26 | 0.20 | 0.66 |
| 10 | 10 | 115 | 135 | 33 | 0.09 | 0.07 | 0.30 |
| 11 | 36 | 61 | 77 | 45 | 0.59 | 0.47 | 0.80 |

FIG. 4 discloses acoustic spacing ratios for exemplary gas turbine engines as described herein. Engines #1, 2, 4, 5, and 19 illustrate exemplary engines with fan blades having fan diameters in the FBD #1 range, Engines #3, 6, 7, 8, 13, 14, 15, 17, 18, 20, 21, and 22 illustrate exemplary engines with fan blades having fan diameters in the FBD #2 range, and Engines #9, 10, 11, 12, and 16 illustrate exemplary engines with fan blades having fan diameters in the FBD #3 range. In each of the exemplary engines, the ASR is in the range of 1.5 to 16.0.

As noted above, the ASR can be in the range of 1.5 to 16.0, or as shown in FIG. 4, in ranges from 1.5 to 4.1, 1.5 to 3.1, 1.6 to 3, 1.6 to 2.4 or 2.0 to 3, and, depending on the desired fan blade selection, higher ratios such as 4 to 14, 6.6 to 13.5, or 6.5-10.2.

In some embodiments, it was additionally found that the acoustic performance can be further improved without negatively affecting other aspects of performance by using composite fan blades to enable a higher bypass ratio. A higher bypass ratio can reduce noise generation, thereby improving acoustic performance, by reducing the fan pressure ratio of the fan (eg., from 1.5 to 1.4, or 1.35), and operating within the defined ranges for BEAL and ASR, as discussed above. Some embodiments include turbomachines with bypass ratios of 10:1 to 17:1, or, in other examples from 12:1 to 15:1, where bypass ratio is defined as the ratio of air passing through the fan case that bypasses the inlet to the engine core, to the air that enters the engine core, at a takeoff condition. For the higher bypass ratios in this range, it was found that composite blades, operating in the defined BEAL and ASR ranges, provide improved acoustic performance while also providing improved blade toughness when encountering flutter or foreign object impact that can result in blade loss.

In some embodiments, the fan blades comprise composite materials. For example, the fan blade can comprise fiber-reinforced composite materials that include a matrix and one or more plies with fibers. The fiber-reinforced composite material can be formed from a continuous wrap ply or from multiple individual plies. In some examples, the fiber-reinforced composite material can be formed with a plurality of fiber plies (or bands) interwoven in an in-plane and out-of-plane orientation by interleaving each of the plurality of fiber bands with one or more of the plurality of fiber bands previously laid down and not in a common plane to fill the one or more gaps and define a uniformly covered multi-layered assembly. The plurality of fiber bands can also be interwoven in three or more different orientation angles, as described in U.S. Pat. No. 9,249,530, which is incorporated by reference in its entirety herein. In some examples, the fibers can be woven in three dimensions as described in U.S. Pat. No. 7,101,154, which is incorporated by reference in its entirety herein.

The fiber types may be mixed within a given layer, ply or different plies may be formed using different fiber types. In one example, harder, shear resistant fibers may be incorporated at an impact surface, while the fiber near a back surface may be selected for enhanced energy absorption. Non-limiting examples of harder shear resistant fibers include metallic or ceramic fibers. Non-limiting examples of fibers with relatively high energy absorption include S-glass, aramid fibers (eg., Kevlar® and Twaron®), as well as oriented polyethylene fibers, such as Spectra® and Dyneem®. Kevlar® is sold by E. I. du Pont de Nemours and Company, Richmond Va. Twaron® aramid fibers are sold by Tejin Twaron, the Netherlands. Spectra® fiber is sold by Honeywell Specialty Materials, Morris N.J. Dyneema® fiber is sold by Dutch State Mines (DSM), the Netherlands.

As discussed above, the inventors have discovered that significant improvements can be made to engine performance using the acoustic spacing ratios and the related considerations described above. However, these improvements can negatively affect other engine parameters and the following disclosure provides manners in which these potential negative effects can be mitigated.

For example, decreasing the acoustic spacing may increase turbulence at the OGVs which in turn can provide increased stresses on the OGVs and negatively impact the noise generated and the performance of the engine. On the other hand, increasing the acoustic spacing to reduce that turbulence can introduce other challenges, such as increased engine length, altered load balances, and potential penalties in weight and aerodynamic efficiency. The inventors have found that the airfoils described below, when used in combination with the acoustic spacing ratios and the related considerations, greatly mitigate potential negative effects associated with the enhancements to acoustic spacing.

As described below, maintaining a stage protection factor (SPF) results in significant improvements in airfoil performance. Maintaining the SPF within the preferred range ensures that the protective coverage of the leading edge protectors is tailored to the specific aerodynamic and structural requirements of each airfoil stage. This balance is particularly important when acoustic spacing changes are implemented, as the increased spacing can affect the aerodynamic flow patterns and the forces acting on the airfoils. By keeping the SPF within the range, the engine can achieve the desired noise reduction without compromising other critical performance metrics, such as thrust efficiency, fuel consumption, and structural durability.

In essence, the inventors have found that the SPF acts as a safeguard against the unintended consequences of acoustic spacing changes. It provides a framework for evaluating how modifications to the spacing impact the protective coverage and aerodynamic performance of the airfoils. Without the SPF, the trade-offs between noise reduction and other performance factors could lead to disadvantageous designs that either fail to meet noise requirements or impose unacceptable penalties on engine efficiency and weight. By integrating the SPF into the design process, the engine achieves a harmonious balance between acoustic performance and overall system efficiency, ensuring that noise reduction efforts do not come at the expense of other critical design objectives.

Figure 5:
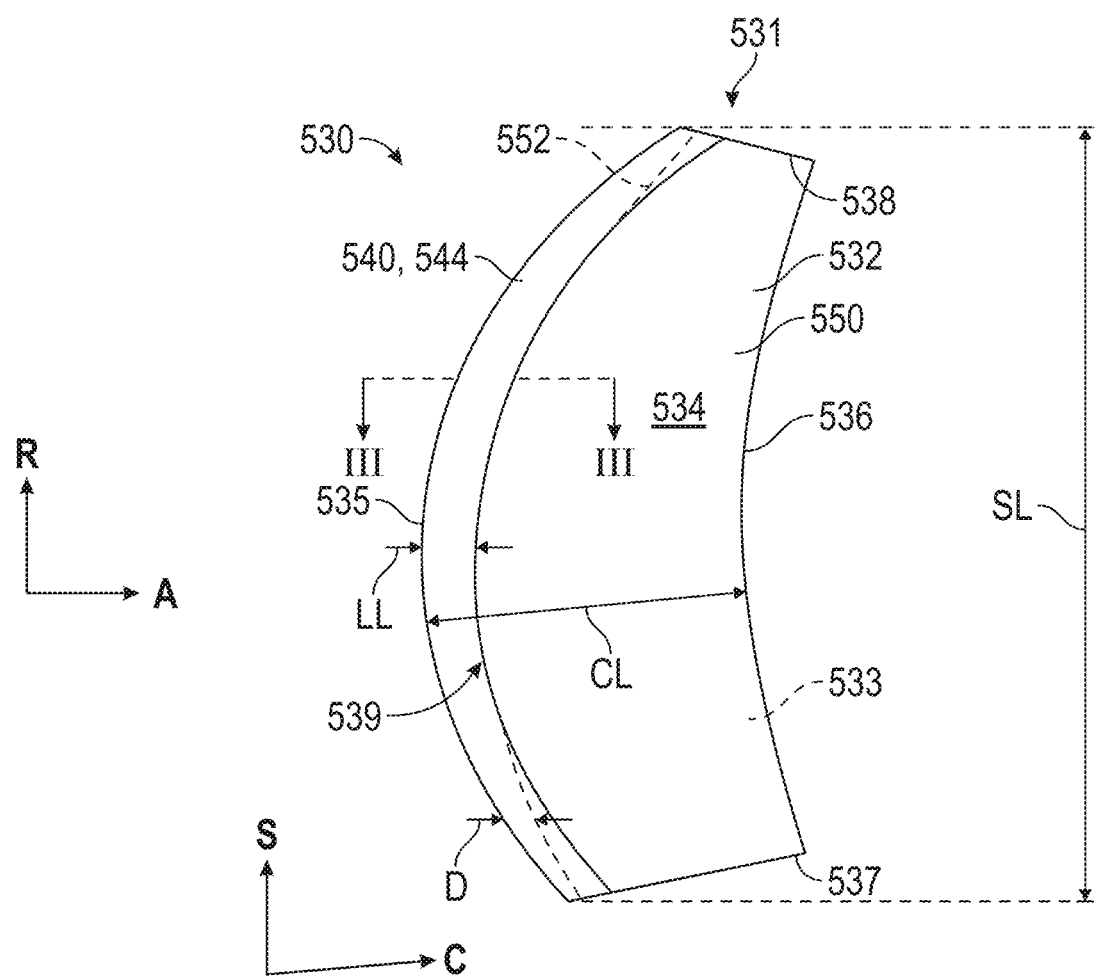
FIG. 5 is a schematic illustration of a composite airfoil in the form of a fan blade according to an exemplary embodiment of the present disclosure.

FIG. 5 is schematic illustration of a composite airfoil 530 in the form of, by way of non-limiting example, a fan blade 531. The fan blade 531 can be, by way of non-limiting example, a blade of the set of fan blades or a blade from the compressor blades or the turbine blades. Further, the composite airfoil 530 can be a vane of the set of OGVs or other vanes.

The composite airfoil 530 can include a wall 532 bounding an interior 533. The wall 532 can define an exterior surface 534 extending radially between a leading edge 535 and a trailing edge 536 to define a chordwise direction (denoted "C"). The composite airfoil 530 has a chord length (denoted "CL") measured along the chordwise direction C between the leading edge 535 and the trailing edge 536. The exterior surface 534 can further extend between a root 537 and a tip 538 to define a spanwise direction (denoted "S"). The composite airfoil 530 has a span length (denoted "SL") measured along the spanwise direction S between the root 537 and the tip 538 where the root is considered 0% of the span length SL and the tip 538 is considered 100% of the span length SL. The span length SL is the maximum distance between the root 537 and the tip 538 of the composite airfoil 530. It will be understood that the composite airfoil 530 can take any suitable shape, profile, or form including that the leading edge 135 need not be curved.

An axial direction (denoted "A") extends generally across the page from right to left. The axial direction A is parallel to the engine centerline. A radial direction (denoted "R") extends perpendicularly away from the axial direction A. It should be understood that the spanwise direction S is parallel to the radial direction R. The chordwise direction C can extend generally along the axial direction A, however with more bend in the composite airfoil 530, it should be understood that the chordwise direction C can extend both into and out of the page and across the page from left to right.

The exterior surface 534 is defined by a leading edge protector 540 and a composite portion 550. A seam 539, separates the leading edge protector 540 from the composite portion 550 along the exterior surface 534. The leading edge protector 540 extends along the chordwise direction C between the leading edge 535 and the seam 539 to define a leading length (denoted "LL"). As used herein, the term "seam" refers to the edge or end of a component where it abuts and/or is adjacent to another component (e.g., an end of the leading edge protector 540 adjacent to the composite portion 550, such as where it stops overlapping or overlying the composite portion 550).

The leading edge protector 540 is typically a metallic leading edge protector and can be made of, but is not limited to, steel, aluminum, refractory metals such as titanium, or superalloys based on nickel, cobalt, or iron. The blades can include a first leading edge protector and the OGVs can include a second leading edge protector. For examples, the leading edge protector 540 for the fan blade 531 can be a metallic leading edge protector while a set of stationary vanes downstream from the fan blade 531, by way of non-limiting example the set of OGVs, have a second leading edge protector made of a polyurethane material. Further, the leading edge protectors described herein can be any suitable material such as metal, thermoplastic, or polyurethane, where both are the same, or different.

The composite portion 550 can include a composite leading edge 552 spaced a distance (denoted "D") from the leading edge 535. The composite leading edge 552 can define at least a portion of, or all of the seam 539. It is further contemplated that at least a part of the leading edge protector 540 overlaps the composite portion 550 such that at least a portion of, illustrated in dashed line, or all of the composite leading edge 552 is located upstream from the seam 539. In other words, the leading edge protector 540 can define a sheath 544 on the composite leading edge 552.

The composite portion 550 can be made of one or more layers of material. The one or more layers of material can be applied during the same stage or different stages of the manufacturing of the composite airfoil 530. By way of non-limiting example, composite portion 550 can include at least a polymer matrix composite (PMC) portion or a polymeric portion. The polymer matrix composite can include, but is not limited to, a matrix of thermoset (epoxies, phenolics) or thermoplastic (polycarbonate, polyvinylchloride, nylon, acrylics) and embedded glass, carbon, steel, or Kevlar fibers.

The leading edge protector 540 and the composite portion 550 can be formed by a variety of methods, including additive manufacturing, casting, electroforming, or direct metal laser melting, in non-limiting examples. As used herein, an "additively manufactured" component refers to a component formed by an additive manufacturing (AM) process, wherein the component is built layer-by-layer by successive deposition of material. AM is an appropriate name to describe the technologies that build 3D objects by adding layer-upon-layer of material, whether the material is plastic, ceramic, or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination. It is also contemplated that a process utilized could include printing a negative of the part, either by a refractory metal, ceramic, or printing a plastic, and then using that negative to cast the component.

It will be shown herein that a relationship between the leading length LL and the chord length CL can be referred to herein as an airfoil protection factor or simply as "APF". In other words, for any given composite airfoil 530 having a predetermined chord length CL, an amount of coverage provided by the leading edge protector 540 increases, so does the leading length LL and in turn the APF.

Figure 6:
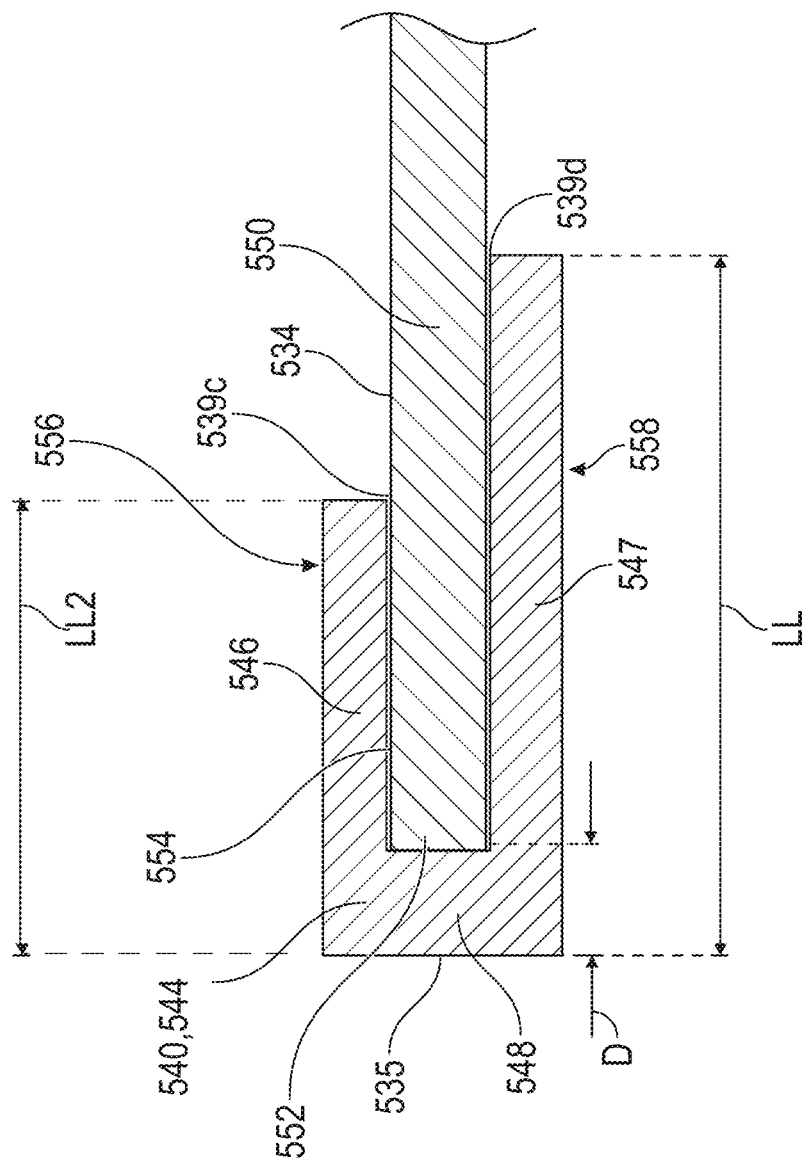
FIG. 6 is a schematic cross-section taken along line III-III of FIG. 5.

FIG. 6 is a schematic cross-section taken along line III-III of FIG. 5. The leading edge protector 540 is the sheath 544 with a first wall 546, a second wall 547, and a third wall 548 interconnecting the first wall 546 and the second wall 547. The first wall 546, second wall 547, and third wall 548 of the leading edge protector 540 are oriented and shaped such that they define a generally U-shaped (or C-shaped) channel 554 therebetween. As shown in FIG. 6 and as will be discussed below, the channel 554 is sized and shaped to receive the composite leading edge 552 of the composite portion 550. Notably, the shape of the channel 554 is shown by way of example only and the channel 554 is not limited to this specific shape and is not drawn to scale.

The composite airfoil 530 can extend between a first side 556 and a second side 558. The seam 539 can be two seams 539c, 539d at corresponding ends of the channel 554. The leading length LL is measured from the leading edge 535 to the seam 539d furthest from the leading edge 535. While illustrated at two different locations, it should be understood that the seams 539c, 539d can be located at the same leading length LL.

In some embodiments, the pressure side of the leading edge protector 540 can be longer than a length than a length of the suction side of the leading edge protector 540. For example, as shown in FIG. 6, length LL is associated with the pressure side of the leading edge protector 540 and length LL2 is associated with the suction side of the leading edge protector 540. In some examples, a ratio of LL to LL2 is greater than 1:1 and less than or equal to 3:1. In some examples the ratio of LL to LL2 is 1.25:1 to 2.75:1, 1.25:1 to 2.5:1, 1.5:1 to 2.5:1, or 1.75:1 to 2.25:1, or 1.25:1-2.0:1. For a respective ratio of LL to LL2 as described above, the ratio applies across the entire range of 20%-80% span (e.g., the leading edge protector meets the recited range for all measurements taken from 20%-80% span locations), or in some examples, this ratio applies for at least one measurement across the range of 20%-80% span locations (e.g., the leading edge protector meets a recited range above at one location, e.g., 50% span, but not at any other location along the 20%-80% span locations).

While illustrated as rectangular blunt ends at the seam 539, the leading edge protector 540 can taper such that the leading edge protector 540 and the composite portion 550 are flush to define the exterior surface 534.

Figure 7:
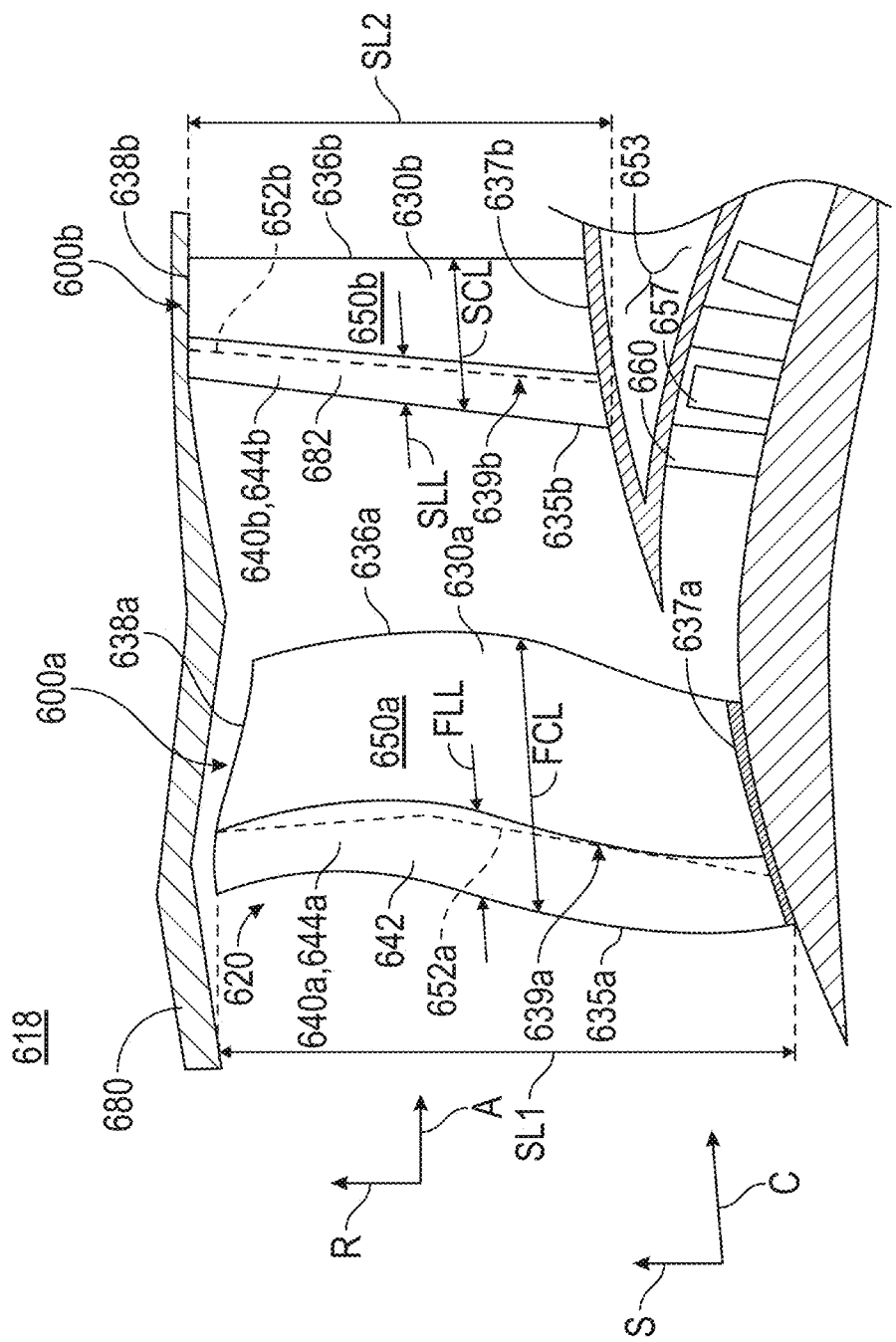
FIG. 7 is a schematic enlarged view of an exemplary fan section according to an exemplary embodiment of the present disclosure.

FIG. 7 is schematic enlarged view of a fan section 618. A set of compressor stages 653 include a set of compressor blades 657 rotating relative to a corresponding set of static compressor vanes 660. A set of fan blades 642 define a fan section 618 including a fan 620. The turbine engine can include a fan casing 680 surrounding the fan 620.

The set of fan blades 642 defines a first stage of airfoils 600a within the fan section 618. A first airfoil 630a in the first stage of airfoils 200a is similar to the previously described airfoil 530 (FIG. 5). While only a single fan blade is shown in the cross-section it will be understood that that the set of fan blades 642 are included and spaced about the fan section 618.

The first airfoil 630a has a first span length (denoted "SL1") measured along the spanwise direction S between a first root 637a and a first tip 638a where the first root 637a is considered 0% of the first span length SL1 and the first tip 638a is considered 100% of the first span length SL1. The first span length SL1 is the maximum distance between the first root 637a and the first tip 638a of the first airfoil 630a.

A first leading edge protector 640a extends along the chordwise direction C between a first leading edge 635a and a first seam 639a to define a first leading length (denoted "FLL"). The first airfoil 630a has a first chord length (denoted "FCL") measured along the chordwise direction C between the first leading edge 635a and the first trailing edge 636a.

A relationship between the first leading length (FLL) and the first chord length (FCL) is denoted herein with a first expression of the APF:

$$APF1 = \frac{FLL}{FCL} \qquad (3)$$

OGVs 682 define a second stage of airfoils 600b downstream from the first stage of airfoils 600a. A second airfoil 630b in the second stage of airfoils 600b can be similar to the previously described airfoil 630. The second airfoil 630b is located downstream from the first airfoil 630a. While only a single outlet guide vane 682 is shown in the cross-section it will be understood that the OGVs 682 are multiple OGVs spaced about the fan section 618.

A second leading edge protector 640b extends along the chordwise direction C between a second leading edge 635b and a second seam 639b to define a second leading length (denoted "SLL"). The second airfoil 630b has a second chord length (denoted "SCL") measured along the chordwise direction C between the second leading edge 635b and second trailing edge 636b.

The second airfoil 630b has a second span length (denoted "SL2") measured along the spanwise direction S between a second root 637b and a second tip 638b where the second root 637b is considered 0% of the second span length SL2 and the second tip 638b is considered 100% of the second span length SL2. The second span length SL2 is the maximum distance between the second root 637b and the second tip 638b of the second airfoil 630b.

The first and second leading edge protectors 640a, 640b can each define first and second sheaths 644a, 644b. An exterior surface of each airfoil 630a, 630b is defined by the corresponding leading edge protectors 640a, 640b and a corresponding composite portion 650a, 650b. The composite portions 650a, 650b can each include a corresponding composite leading edge 652a, 652b which can define at least a portion of, or all of the corresponding seams 639a, 639b.

A relationship between the second leading length (SLL) and the second chord length (SCL) is denoted herein with a second expression of the APF:

$$APF2 = \frac{SLL}{SCL} \quad (4)$$

As will be further discussed herein, the APF describes an amount of protection coverage by the leading edge protector of any of the airfoils 630, 630a, 630b described herein. A balance trade-off between the amount of protection and the weight gain/loss associated with any of the protector portions described herein can be expressed by an APF value of from 0.1 to 0.3, inclusive of endpoints. In other words, to satisfy protection requirements the leading edge protector described herein should protect at least 10% and up to and including 30% of the composite airfoil before becoming too heavy.

The first stage of airfoils 600a has a first number of airfoils and the second stage of composite airfoils 600b has a second number of airfoils different than the first number. In other words, the consecutive stages of airfoils can vary in size and number of airfoils. Further, the first stage of composite airfoils 600a and the second stage of composite airfoils 600b can both be configured to rotate.

Table 3 below illustrates some composite airfoil configurations that yielded workable solutions to the trade-off balance problem.

TABLE 3

| | Example: | | | | | |
|---|---|---|---|---|---|---|
| | 1 | 2 | 3 | 4 | 5 | 6 |
| CL (cm) | 47 | 11 | 29 | 60 | 9.7 | 13 |
| LL (cm) | 11 | 1.7 | 3.2 | 16 | 1.5 | 2.3 |
| SL (%) | 20 | 20 | 38 | 50 | 50 | 80 |

A desired amount of protective covering of the composite airfoil lies within a specific range based on the leading length LL of the protective covering and the chord length CL of the composite airfoil.

Table 4 below illustrates some consecutive composite airfoil stages with workable solutions to the trade-off balance problem. Different span percentages are shown in Table 3. It was found that the CL and LL should be taken for any position between 20% and 80%, inclusive of end points of the span length SL. The specific range of the span length was chosen because the airfoil may have different properties, profiles, etc. at its distal ends. In the non-limiting examples, the fan blade dimensions determine APF1 while the outlet guide vane dimensions determine APF2.

TABLE 4

| Fan Blade | | | Outlet Guide Vane | | |
|---|---|---|---|---|---|
| Span (%) | CL (cm) | LL (cm) | Span (%) | CL (cm) | LL (cm) |
| 20 | 46.9 | 11.2 | 20 | 31.4 | 3.18 |
| 24 | 48.3 | 11.6 | 26 | 30.6 | 3.18 |
| 28 | 50.5 | 13.6 | 32 | 30.0 | 3.18 |
| 32 | 52.4 | 14.2 | 38 | 29.3 | 3.18 |
| 36 | 54.5 | 14.6 | 44 | 28.7 | 3.18 |
| 40 | 56.5 | 15.0 | 50 | 28.1 | 3.18 |
| 44 | 58.2 | 15.3 | 56 | 27.5 | 3.18 |
| 48 | 59.4 | 15.5 | 62 | 26.9 | 3.18 |
| 52 | 60.1 | 15.7 | 68 | 26.6 | 3.18 |
| 56 | 60.6 | 15.6 | 74 | 26.7 | 3.18 |
| 60 | 61.0 | 15.7 | 80 | 27.4 | 3.18 |
| 64 | 61.5 | 15.5 | | | |
| 68 | 61.9 | 15.4 | | | |
| 72 | 65.0 | 15.4 | | | |
| 76 | 63.2 | 15.5 | | | |
| 80 | 64.4 | 15.7 | | | |

A relationship between the first expression of the APF, APF1, and the second expression of the APF, APF2, defines the protection amount for successive stages of airfoils. The amount of protection provided by the first leading edge protector 640a on the first airfoil 630a can affect an amount of protection necessary for the second airfoil 630b downstream of the first airfoil 630a. This relationship between the multistage airfoils or successive airfoils, such as 630a and 630b, can be described by a stage performance factor (denoted "SPF") determined from a relationship between the APF1 and the APF2. The stage performance factor can generally be represented by a ratio of the first airfoil protection factor APF1 to the second airfoil protection factor APF2 represented by:

$$SPF = \frac{APF1}{APF2} \quad (5)$$

For any position between 20% and 80%, inclusive of end points of the span length SL, a desired SPF value is greater than or equal to 0.70 and less than or equal to 4 ($0.7 \leq SPF \leq 4$). The specific range of the span length was chosen because the airfoil may have different properties, profiles, etc. at its distal ends. Conversely, at any position between 20% and 80%, inclusive of end points the airfoil is more uniform and therefore the determined ratios are applicable. It will be understood that because of its position and movement, the rotating fan blade will likely require more coverage from the leading edge protector as compared to a static airfoil or OGV, which is driving the relationship ratio to the 0.7 to 4.0 range. This is due to the fact that the rotating blade has a higher kinetic energy from impact and is driven by the rotating velocity of the airfoil.

The SPF for a set first set of airfoils and a second set of airfoils downstream from the first set of airfoils can be an SPF range of greater than or equal to 0.95 and less than or equal to 2.5 (0.95≤SPF≤2.5). This range provides more insight to the requirements for a given engine well before specific technologies, integration and system requirements are developed fully. For example, as the fan speed is reduced, coverage on the first leading edge 635a by the first leading edge protector can decrease such that the APF1 also decreases.

The SPF value represents how an amount of protection on a first stage of airfoils, like the first stage of airfoils 600a, impacts an amount of protection necessary for any downstream airfoil stages with respect to the first set of airfoil stages.

In addition, as discussed above, the inventors have discovered that the improvements provided by maintaining the SPF in the preferred ranges are surprisingly beneficial when used in combination with the acoustic spacing enhancements discussed above. When acoustic spacing is increased, the aerodynamic loading on the fan blades and OGVs changes. Thus, while the acoustic spacing relationships described herein reduce the noise footprint of the engine, meeting stringent community noise requirements, the SPF ensures that the protective and aerodynamic characteristics of the airfoils are addressed to handle the changes introduced by the spacing adjustments. This combination not only enhances the acoustic performance of the engine but also ensures that the engine remains efficient, lightweight, and durable, achieving a well-rounded design that addresses multiple engineering challenges simultaneously.

In one example, the set of fan blades 642 illustrated in FIG. 7 can have dimensions of the Fan Blade at 20% from Table 4 and the set of outlet guide vanes 182 can have dimensions of the Outlet Guide Vane at 20% from Table 4. This results in an APF1 value of (11.2/46.9) or 0.24 and an APF2 value of (3.18/31.4) or 0.10. Using the SPF ratio, an SPF value of (0.24/0.10) or 2.40 is found.

In another example, the set of fan blades 642 illustrated in FIG. 7 can have dimensions of the Fan Blade at 68% from Table 4 and the set of outlet guide vanes 182 can have dimensions of the Outlet Guide Vane at 68% from Table 4. This results in an APF1 value of (15.4/61.9) or 0.25 and an APF2 value of (3.18/26.6) or 0.12. Using the SPF ratio, an SPF value of (0.25/0.12) or 2.1 is found.

Some lower and upper bound values for each design parameter for determining Expression (3) are provided below in Table 5:

TABLE 5

| Parameter | Lower Bound | | Upper Bound | |
|---|---|---|---|---|
| SL (%) | 20 | 80 | 20 | 80 |
| First Airfoil | | | | |
| FCL (cm) | 24 | 32 | 56 | 77 |
| FLL (cm) | 6 | 8 | 13 | 19 |
| Second Airfoil | | | | |
| SCL (cm) | 9.9 | 9.3 | 31 | 27 |
| SLL (cm) | 1.6 | 1.5 | 4 | 3.5 |

It was found that first and second airfoil pairs with dimensions fitting in the ranges set out in Table 6 below fit into the composite airfoil dimensions previously described herein. These ranges enable a minimum weight gain for a compact and proficiently protected composite airfoils in succession.

TABLE 6

| Ratio | Narrow Range | Broad Range |
|---|---|---|
| SPF | 0.95-2.5 | 0.70-4.0 |
| APF1 | 0.22-0.25 | 0.20-0.30 |
| APF2 | 0.10-0.12 | 0.08-0.17 |

Pairs of first and second airfoils, with the second airfoils placed downstream of the first, can be assembled to fit any fan section or downstream stage for blades and vanes. This applies to various engine designs, including ducted engines, direct-drive, and indirect-drive configurations like speed reduction or geared-drive setups. The gas turbine engine can be either a variable pitch engine (with a fan that adjusts its pitch) or a fixed pitch engine (with non-rotatable fan blades).

It will be understood that a speed reduction device including, but not limited to, a gear assembly (e.g., gearbox assembly 160 shown in FIG. 1) may be provided to reduce a rotational speed of the fan assembly relative to a driving shaft (such as a low pressure shaft coupled to a low pressure turbine). In some embodiments, a gear ratio of the input rotational speed to the output rotational speed is greater than or equal to 2. For example, in particular embodiments, the gear ratio is within a range of 2.0 to 6.0, within a range of 2.5 to 5.0, or within a range of 3.0 to 4.0. For example, the gear ratio can be 2.0 to 2.9, 3.2 to 4.0, or 3.25 to 3.75. In some examples, a gear ratio of the gearbox assembly can be 4.1 to 6.0 or 4.1 to 5.0.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low pressure compressor may include 1 to 8 stages, a high-pressure compressor may include 8 to 15 stages, a high-pressure turbine may include 1 to 2 stages, and/or a low pressure turbine (LPT) may include 3 to 7 stages. In particular, the LPT may have 4 stages, or between 4 and 7 stages. For example, in certain embodiments, an engine may include a one stage low pressure compressor, an 11 stage high pressure compressor, a two stage high pressure turbine, and 4 stages, or between 4 and 7 stages for the LPT. As another example, an engine can include a three stage low-pressure compressor, a 10 stage high pressure compressor, a two stage high pressure turbine, and a 7 stage low pressure turbine.

The SPF is useful for making trade-offs when determining an amount of protection on a first airfoil in relationship to an amount on an airfoil downstream of the first airfoil. For example, when there is a limited space available for a fan blade in a fan section, knowledge of those dimensions and the downstream airfoil dimensions enables determination of an acceptable cover with a leading edge protector length allowing for sufficient leading edge protection.

The SPF helps quickly assess design parameters for composite airfoils in downstream positions. It allows for easy visualization of tradeoffs in geometry, considering constraints like materials, space, engine type, and surrounding components. This leads to the creation of high-performing composite airfoils. By narrowing down factors, it saves time, money, and resources, and improves overall system performance. Unlike previous designs that excelled in one area but lacked in others, the SPF enables the development of composite airfoils that perform well across multiple metrics within given constraints.

As discussed above, aerodynamic efficiency may be further improved in the gas turbine engines disclosed herein by reducing the blade solidity at the airfoil tips by reducing the number of blades (e.g., from twenty-two to twenty or eighteen) while maintaining a similar ratio of the tip chord over the tip diameter C/D in the fan.

Figure 8:
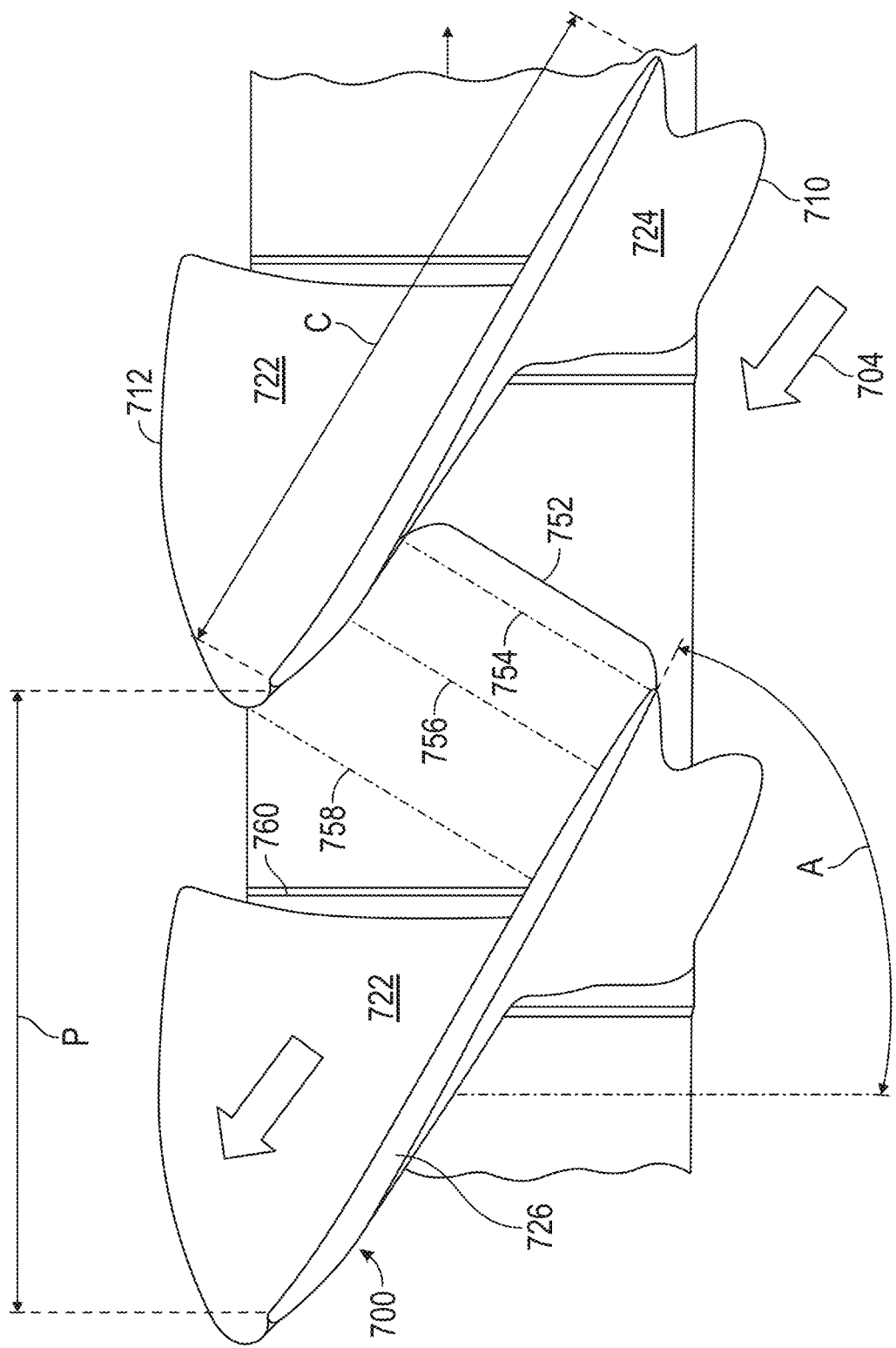
FIG. 8 is a top plan view of two adjacent airfoils having staggers that increase from the roots to the tips of the airfoils.

In this regard, and referring to FIG. 8, adjacent airfoils 700 define circumferentially therebetween corresponding flow passages 752 for pressurizing air 704 during operation. Each of the airfoils 700 includes stagger (or twist) represented by the stagger angle A from the axial or longitudinal axis.

The stagger increases from the root to the tip 726 of the airfoil 700. For example, the stagger angle A at the blade tip 726 may be relatively substantial (e.g., about 60 degrees) to position the leading edge 710 of one airfoil circumferentially adjacent but axially spaced from a suction side 724 of the next adjacent airfoil aft from the leading edge thereof to define a corresponding mouth 754 for the flow passage between the opposing pressure and suction sides 722, 724 of the adjacent airfoils 700. The contours and stagger of the adjacent airfoils 700 over the radial span of the blades cause each flow passage 752 to converge or decrease in flow area to a throat 756 of minimum flow area spaced aft from the mouth 754 along most, if not all, of the radial span.

As further illustrated in FIG. 8, a relatively high airfoil stagger A also positions the trailing edge 712 of one airfoil 700 circumferentially adjacent to the pressure side 722 of the next adjacent airfoil 700 while also being spaced axially therefrom in the tip region to define a corresponding discharge or outlet 758 for the corresponding flow passage 752 between adjacent airfoils 700. In this way, the incoming air 704 is channeled in the corresponding flow passages 752 between adjacent airfoils 700 as they rotate clockwise in FIG. 8 for pressurizing the air 704 to produce the propulsion thrust during operation.

As shown in FIG. 8, a sloped platform 760 is disposed between corresponding pairs of adjacent airfoils 700 to conform with or match roots 702 of the blades, which may be in the form of sloped roots 702 to define the radially inner boundary of the fan air flowpath. Each platform 760 may be a discrete or separate component suitably mounted to the supporting fan disk between adjacent airfoils, or may be formed in halves integrally formed with the opposite sides of each fan blade along the roots thereof. The platform 760 slopes radially outwardly in the downstream or aft direction between the leading and trailing edges of the blade at a slope angle B (shown in FIG. 10) of about 15-20 degrees, and defines the radially inner boundary of each flow passage 752 between the blades. The sloped platform 760 cooperates with the airfoils themselves in pressurizing the airflow flowing downstream therepast.

The inner part of airfoil 700 typically operates with subsonic airflow to supercharge or pressurize the inner air 704 as it enters a booster compressor. The outer part of the fan blade, with its tip 726 at a large outer diameter, rotates at a speed that creates supersonic airflow during certain parts of the aircraft's operating envelope.

Figure 9:
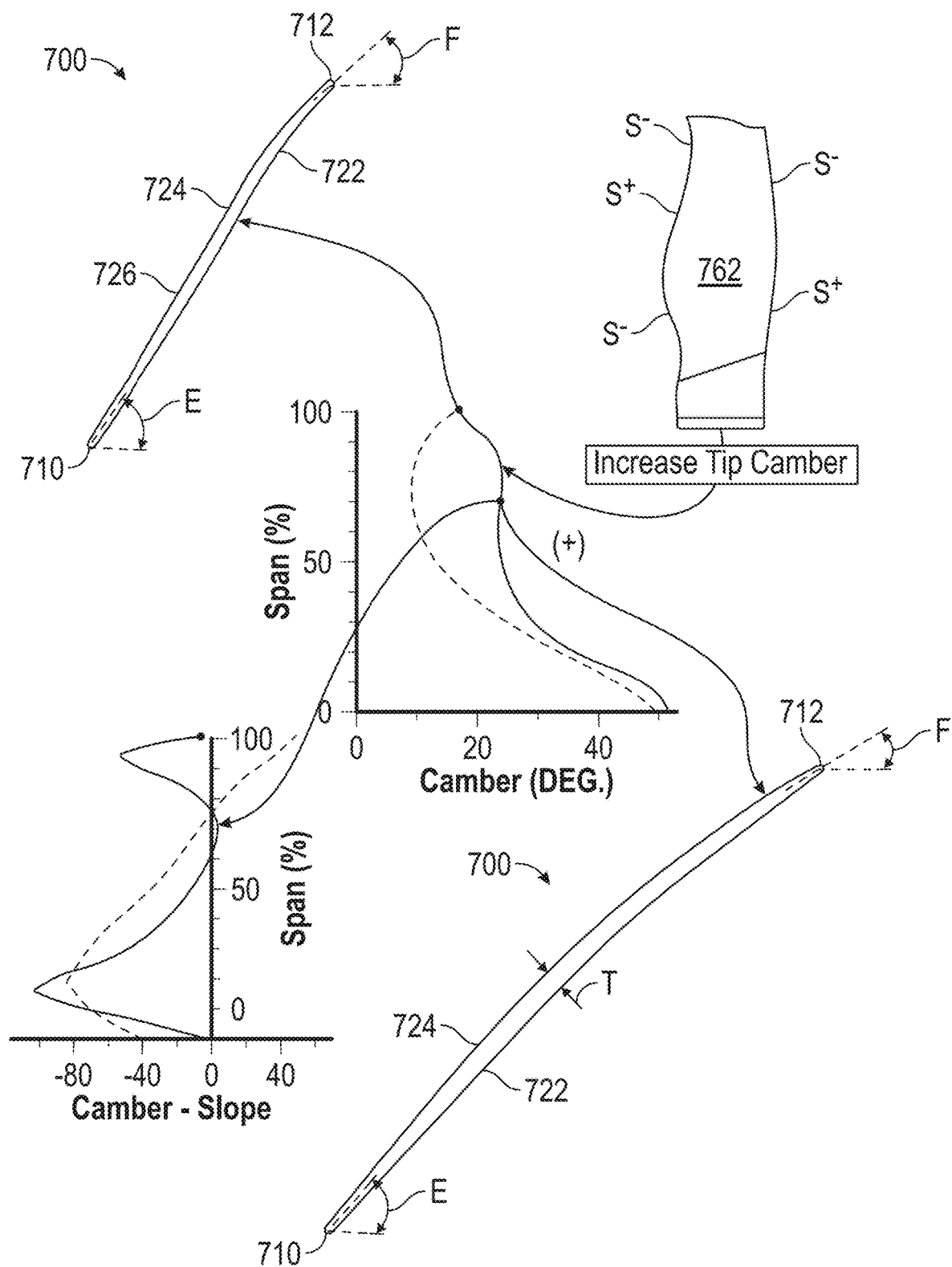
FIG. 9 illustrates two scaled graphs of airfoil camber and slope thereof versus span.

Another feature affecting the airfoil 700's aerodynamic performance is its camber, which is the curvature between the leading and trailing edges 710, 712. FIG. 9 shows two graphs of camber and slope over the airfoil's span from its root 702 at zero percent span to its tip 726 at 100 percent span, along with two radial sections at 70 percent and 100 percent span.

The airfoil camber may be defined by the difference in local axial inlet angle E at the leading edge 710 and the local axial exit angle F at the trailing edge 712. The camber line of the airfoil 700 is the mean line extending between the leading and trailing edges 710, 712 of each section between the opposite pressure and suction sides 722, 724. At the leading edge 710, the camber line defines the inlet angle E relative to the axial or longitudinal axis of the engine, and at the trailing edge 712, the camber line defines the exit angle F also relative to the axial axis.

The camber for each radial section of the airfoil 700 may be simply obtained by subtracting the exit angle F from the inlet angle E, with the resulting camber represented in degrees as shown in the camber graph from root 702 to tip 726 of the airfoil 700. The graph illustrates that the camber for a fan blade decreases between the root 702 and tip 726 of the airfoil 700 in a substantially smooth curve from root to just short of the tip 726, with a slight local increase or peak in camber in the outer span of the airfoil 700 immediately below the tip 726.

As indicated above, the airfoil 700 illustrated in FIG. 8 has substantial twist or stagger A of about 60 degrees for example from root 702 to tip 726, along with a corresponding variation in camber of the individual radial sections from root 702 to tip 726, and with a relatively large chord. The airfoil 700 is specifically configured to distinctly include sharp leading and trailing edges 710, 712 from root 702 to tip 726 which gradually increase in airfoil thickness to a maximum thickness along the midchord region between the opposite leading and trailing edges 710, 712.

For example, the sharp leading edge 710 of the airfoil 700 may be defined by a circumscribed square outline in the exemplary range of 26 to 42 mils (0.66-1.0 mm) thickness, with the sharp trailing edge 712 being represented by an inscribed circle of diameter 28 to 40 mils (0.7-1.0 mm). The maximum thickness of the airfoil 700 correspondingly ranges from about 120 to 260 mils (3-6.6 mm) from root 702 to tip 726, which maximum thickness varies along the chord in the exemplary range of 40 percent to 60 percent from the leading edge 710 in axial projection of the twisted airfoil 700 along the longitudinal engine axis.

As shown in FIG. 8, the stagger A and length of the chord C combine to effect the three-dimensional (3D) configuration of each airfoil 700. The section chords of the airfoil 700 typically increase in length outboard from the root 702 to correspondingly barrel the airfoil 700 above the root 702. The airfoil or chord barreling may be observed in the axial side projection, which locally enlarges the midspan region of the airfoil 700 preferably along both the leading and trailing edges 710, 712. The maximum airfoil barrel occurs at a suitable midspan region of the airfoil at an intermediate radial section of about 40 percent span from the root 702 in the exemplary embodiment illustrated.

The leading edge barreling projects the leading edge forward of a straight line between the root 702 and tip 726 at the leading edge 710. Similarly, the trailing edge barreling projects the trailing edge aft of a straight line between the root 702 and tip 726 at the trailing edge 712. Thus, the leading edge 710 extends axially forward of the root 702, and the trailing edge 712 extends axially aft from the root 702.

Figure 10:
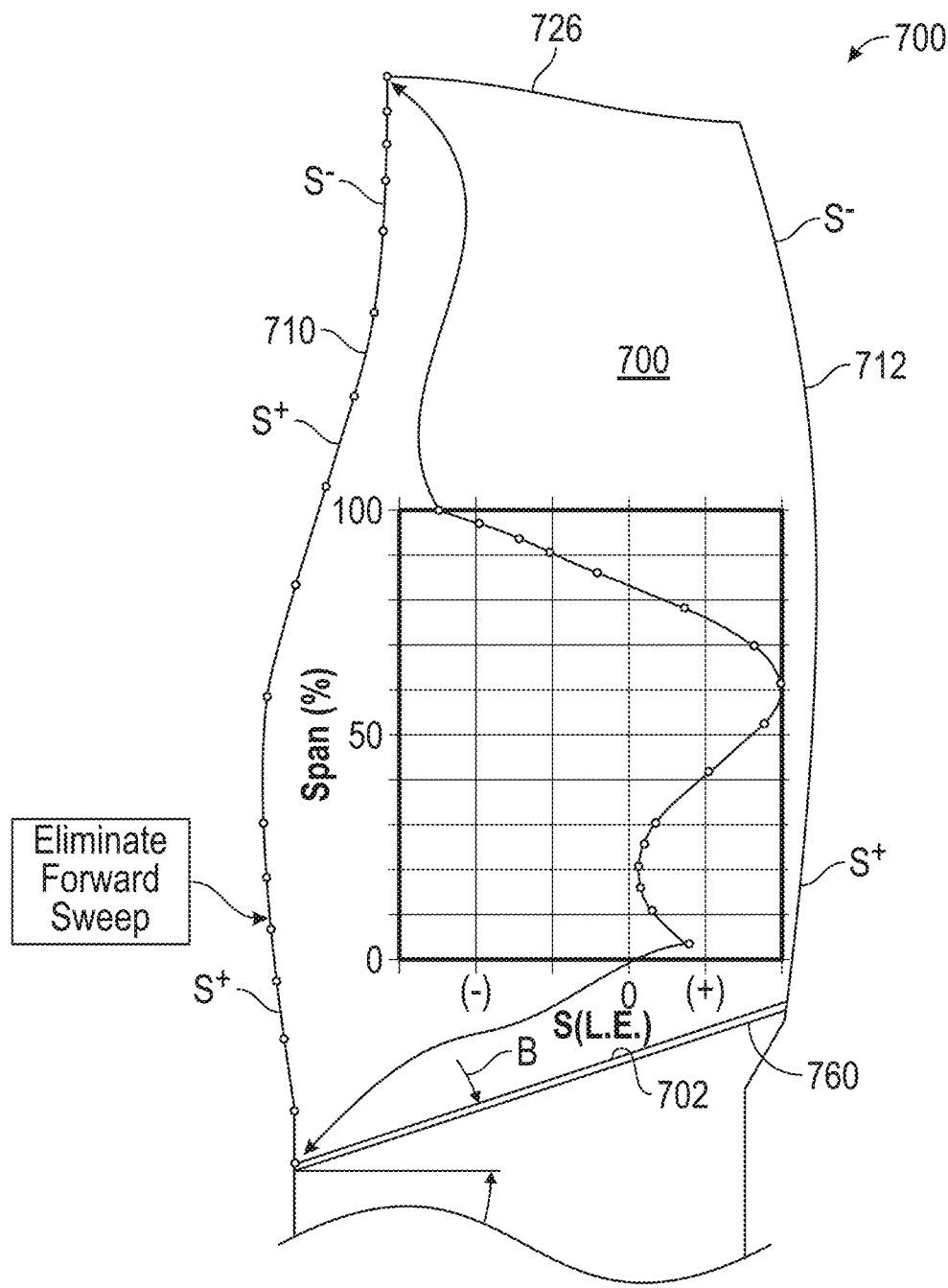
FIG. 10 is a side elevational view of an airfoil and a graph of corresponding aerodynamic sweep thereof.

Airfoil barreling is another feature of airfoil 700 that affects its 3D configuration and aerodynamic performance in pressurizing airflow during operation. Aerodynamic sweep, represented by a local sweep angle, depends on the direction of incoming air and the orientation of the airfoil surface in both axial and circumferential (or tangential) directions. FIG. 10 illustrates the airfoil 700 along with the preferred aerodynamic sweep angle thereof as represented by the upper case letter S which has a negative value (−) for forward sweep, and a positive value (+) for aft sweep. A graph of aerodynamic sweep S for the leading edge 710 from root 702 at zero percent span to tip 726 at 100 percent span is superimposed over the airfoil 700.

The airfoil 700 preferably includes forward aerodynamic sweep S− at the tip 726 from leading edge 710 to trailing edge 712. Chord barreling of the airfoil 700 in conjunction with the forward tip sweep has significant aerodynamic benefits including increased flow capacity at high or maximum fan speed, while also improving part speed efficiency and stability margin.

However, the airfoil 700 illustrated in FIG. 10 preferably includes non-forward aerodynamic sweep between the airfoil maximum barrel radial section and the sloped root 702 for further improving performance of the airfoil 700, particularly for part speed operability favoring cruise operation of the engine in propelling the aircraft in flight.

In the preferred embodiment illustrated in FIG. 10, the airfoil 700 includes relatively low aerodynamic sweep in the hub region near the root 702 or platform 760 which is less than about half the maximum sweep in the airfoil 700 thereabove.

FIG. 10 illustrates that the initially forward sweep S− at the airfoil tip 726 transitions through zero sweep to aft aerodynamic sweep S+ inwardly therefrom in the airfoil barrel both along the leading and trailing edges 710, 712. In particular, the airfoil has maximum forward sweep along the leading edge 710 at the tip 726 which transitions to maximum aft sweep inwardly therefrom along the leading edge 710 in the barrel region of the airfoil 700. From the maximum aft sweep, the sweep decreases in aft magnitude along the leading edge 710 towards the root 702 at zero span.

In the embodiment illustrated in FIG. 10, the airfoil 700 includes zero sweep along the leading edge 710 at the root 702, along with a local smaller peak in aft sweep along the leading edge 710 between the root 702 and the maximum aft sweep. The maximum aft sweep along the leading edge 710 occurs at about 60 percent span from the root, with the sweep remaining aft in magnitude over the entire inner panel span from 60 percent down to the root 702 where it returns to zero sweep.

FIG. 10 shows that the leading edge sweep decreases quickly from the maximum aft sweep near the midspan to a much lower aft sweep in the inner panel down to the root 702, which is significantly less than the maximum aft sweep. The local peak in leading edge sweep occurs at about five percent span and is less than half the maximum aft sweep. The aft sweep remains substantially lower in magnitude over most of the inner panel up to about the 40 percent span elevation.

As indicated above with respect to FIG. 9, the airfoil camber is defined by the difference in the inlet and exit angles (E-F). The inlet angle E preferably increases smoothly over the span of the airfoil 700 from root 702 to tip 726, with the exit angle F of the airfoil increasing from root 702 to tip 726 at a greater rate with about twice the overall magnitude. The increase in exit angle from root 702 to tip 726 may be used to correspondingly decrease the camber from the root 702 toward the tip 726, with the camber graph in FIG. 9 illustrating a local increase in camber in the outer panel immediately below the airfoil tip 726 down to about the midspan within the barrel.

FIG. 9 further illustrates that the camber has a greater rate of decrease, or slope, in the inner panel radially outboard from the root 702 into the barrel to about 50 percent span for example than in the outer panel outboard from within the barrel at the 50 percent span for example toward the radially outer tip 726, which correspondingly locally increases the camber near or just below the airfoil tip 726 over most of the outer panel.

The slope graph of camber illustrated in FIG. 9 shows the pronounced difference in a derived fan blade or airfoil 700 over a preexisting blade 762 for introducing the local increase or peak in camber in the outer panel just below the airfoil tip 726. The slope represents the change in camber over the radial span of the airfoil from root 702 to tip 726.

The slope in both curves is initially negative from the root 702 outward as the camber decreases in magnitude outwardly along the span. The decreasing slope is similar in the two curves in the lower panel of the airfoils 700, and is affected in large part by the specific blade count in the full complement of fan blades in the fan row.

However, from the midspan region outwardly above the barrel in the outer panel, the camber and slope thereof in the solid and dashed curves change significantly. In the dashed curves, the camber decreases outwardly over the inner panel, and then increases locally over the outer panel. The slope or rate of camber change has a negative peak at 20% span in the inner panel, and transitions to a positive peak at the airfoil tip 526 after passing through the zero value at about 73% span. This corresponds with a local minimum peak in camber for the preexisting fan blade 762.

In contrast, the slope of the camber in the derived fan blade over the preexisting blade, although generally similar over the inner panel, is remarkably different over the outer panel so that the camber has a local increase or peak in magnitude at about 80% span between the tip 726 and barrel.

The camber as shown by the solid curve varies in slope with a local negative magnitude or peak in the slope immediately below the tip 526 at about 94% span, followed by a local positive magnitude or peak in the slope at about 70% span therebelow. The solid slope curve therefore crosses the zero line at two locations above the midspan at about 62% and 74% span. And, below the midspan, the solid slope curve has a maximum negative peak at about 15% span.

Accordingly, the camber and its slope in the derived fan blade 700 are specifically configured to effect the local increase in camber in the outer panel just below the tip, with the camber level returning to its minimum value at the airfoil tip 726. In this way, a significant improvement in fan performance and efficiency may be obtained, while reducing efficiency losses at the airfoil tip itself which has a camber level closely similar to conventional practice.

The additional camber of the outer panel of the airfoil may reduce high speed performance of the fan, but can be balanced by the improved performance at part speed, specifically cruise operation of the engine for maximizing overall efficiency of the fan.

Furthermore, the reduction in number of fan blades increases the circumferential pitch P between the airfoils and increases the flow area of the flow passages 752, in particular at the throats 756 thereof, for reducing flow blockage during operation, and specifically at the airfoil tips subject to supersonic operation.

The configuration of the flow passage 752 illustrated in FIG. 8 is particularly important to efficient operation of the fan, and in particular at the airfoil tips subject to supersonic flow. The specific profiles of the pressure and suction sides 722, 724 of the individual airfoils 700, the lateral thickness T of the airfoil, the root-to-tip stagger and camber of the airfoils 700 and, of course, the reduced solidity due to the reduction in blade count while maintaining equal the chord to diameter C/D ratio are all used to define each flow passage 752.

In particular, the airfoil tips 700 are locally angled and vary in thickness T or width between the leading and trailing edges 710, 712 to typically converge the flow passage 752 at the airfoil tips from the mouth 754 to the throat 756 and then diverge the flow passage also at the tip from the throat 756 to the outlet 758. Alternatively, the mouth 754 and throat 756 of the flow passages 752 at the airfoil tips 726 may be coincident in one plane at the leading edges 710, with the flow passages 752 still diverging aft from the throats 756 at the leading edges 710 to the passage outlets 758 at the trailing edges 712.

The convergence angle or slope between the mouth and the throat, and the divergence angle or slope between the throat and the outlet may be specifically designed for maximizing efficiency during supersonic operation of the blade tips in which aerodynamic shock is generated as the airflow 704 is reduced in speed in the converging portion to choked flow of Mach 1 at the throat 756 followed in turn by subsonic diffusion in the diverging portion of the flow passage 752 from or aft of the throat 756 to the outlet 758.

The ratio of the flow area at the passage outlet 758 over the flow area at the throat 756 is a conventional measure of effective camber of the airfoils 700. The actual amount of airfoil camber near the tips 726 thereof may be increased slightly over a conventional turbofan design as indicated above to allow the turbofan to tolerate the lower tip solidity during part-speed operation.

A modern turbofan is designed for an operating range from takeoff to cruise to landing, with cruise operation being predominant and for which maximum efficiency and operability is desired. However, part-speed performance must also be considered in good turbofan design and accommodated by the higher camber introduced near the blade tips for the low solidity turbofan design. Part-speed operability may be improved by increasing the camber of the airfoils 700 at the tips 726 thereof in conjunction with the reduction in solidity by reduction in blade count.

Thus, as described above, the particular combination of acoustic spacing and SPF determinations provide significant improvements. The combination is beneficial for various stages of blades and vanes as described herein since adjustments to acoustic spacing can impact air flow at the fan blades and OGVs, as well as at downstream blades and vanes (e.g., compressor blades and vanes).

In view of the above-described implementations of the disclosed subject matter, this application discloses the additional examples enumerated below. It should be noted that one feature of an example in isolation or more than one feature of the example taken in combination and, optionally, in combination with one or more features of one or more further examples are further examples also falling within the disclosure of this application.

A gas turbine engine comprising: a core turbine engine comprising a low pressure turbine; a gearbox assembly coupled to the low pressure turbine; a fan coupled to the gearbox assembly and having a fan diameter and a plurality of fan blades with a blade solidity that is greater than or equal to 0.8 and less than or equal to 2.0; a blade effective acoustic length (BEAL) defined as:

$$BEAL = \frac{2CL^2}{S(1-rr)N_b}\cos(\gamma)$$

wherein CL is the chord length of a fan blade of the plurality of fan blades, S is a span of the fan blade, rr is a radius ratio of the fan, $\gamma$ is the stagger angle of the fan blade, and $N_b$ is the number of the plurality of fan blades; a nacelle that includes a fan case that surrounds the fan, the fan case comprising an inlet disposed forward of the fan and an inlet length, wherein the inlet length is an axial distance between the leading edge of one of the plurality of fan blades and the inlet to the fan, as measured at a 75% span position of the fan blade; a plurality of outlet guide vanes disposed aft of the fan and extending radially between the core turbine engine and the fan case; an acoustic spacing from the fan blade trailing edge to an outlet guide vane leading edge; an acoustic spacing ratio (ASR) defined as:

$$ASR = \frac{1}{\left(\frac{Nv}{Nb}\right)} \cdot \frac{As}{BEAL}$$

wherein As is the acoustic spacing and Nv is the number of the plurality of outlet guide vanes, and an inlet-to-nacelle (ITN) ratio is defined as a ratio of the inlet length to a maximum diameter of the nacelle, wherein the ASR of the gas turbine engine is 1.5 to 16.0 and the TN ratio is 0.23 to 0.35; wherein the plurality of fan blades are composite fan blades, each of the plurality of composite fan blades comprising: a first composite body extending chordwise between the fan blade leading edge and the fan blade trailing edge; a first leading edge protector having a first protector leading edge different from, and receiving at least a portion of, fan blade leading edge, wherein a first leading length (FLL) extends chordwise from the first protector leading edge to a first end of the first leading edge protector, and a first chord length (FCL) extends chordwise from the first protector leading edge to the fan blade trailing edge; wherein the plurality of outlet guide vanes are composite outlet guide vanes, each of the plurality of composite outlet guide vanes comprising: a second composite body extending chordwise from an outlet guide vane leading edge to an outlet guide vane trailing edge; a second leading edge protector having a second protector leading edge different from, and receiving at least a portion of, the outlet guide vane leading edge, wherein a second leading length (SLL) extends chordwise from the second protector leading edge to a second end of the second leading edge protector, and second chord length (SCL) extends from the second protector leading edge to the outlet guide vane trailing edge; wherein the first leading length (FLL) and the first chord length (FCL) relate to the second leading length (SLL) and the second chord length (SCL) by an expression: ((FLL/FCL)/((SLL/SCL)) to define a stage protection factor (SPF), and wherein the SPF is greater than or equal to 0.7 and less than or equal to 4 (0.7<SPF<4).

The gas turbine engine of the preceding claim, wherein at least one of the first airfoil and the second airfoil is an airfoil that extends outwardly from an airfoil root and that includes opposite pressure and suction sides that extend longitudinally in span from the airfoil root to an airfoil tip, and that extend axially in chord between opposite airfoil leading and trailing edges, the airfoil further including stagger that increases between the airfoil root and the airfoil tip, camber that decreases therebetween, and chord length that increases outboard from the airfoil root to barrel the airfoil along both the airfoil leading and trailing edges, the airfoil further including forward aerodynamic sweep at the airfoil tip, and non-forward aerodynamic sweep between a maximum barrel in the airfoil and the airfoil root.

The gas turbine engine of any proceeding clause, wherein the composite fan blades and the composite outlet guide vanes include a polymer matrix composite (PMC).

The gas turbine engine of any proceeding clause, wherein at least one of the first leading edge protector or the second leading edge protector is a metallic leading edge protector.

The gas turbine engine of any proceeding clause, wherein a respective one of the composite fan blades extends spanwise between a first root and a first tip to define a first span length and wherein a respective one of the composite outlet guide vanes extends spanwise between a second root and a second tip to define a second span length.

The gas turbine engine of any proceeding clause, wherein the SPF is determined between 20% and 80% of the first span length and the second span length, inclusive of endpoints.

The gas turbine engine of any proceeding clause, wherein there is a first number of composite fan blades airfoils and a second number of composite outlet guide vanes and the first number is different than the second number.

The gas turbine engine of any proceeding clause, wherein the SPF is greater than or equal to 0.95 and less than or equal to 2.5 (0.95<SPF<2.5).

The gas turbine engine of any proceeding clause, wherein the first leading edge protector and the second leading edge protector each comprise a sheath The gas turbine engine of any proceeding clause, wherein the first sheath and the second sheath each have a first wall, a second wall, and a third wall interconnecting the first wall and the second wall.

The gas turbine engine of any proceeding clause, wherein the first wall, second wall, and third wall of the leading edge protector are oriented and shaped such that they define a U-shaped or C-shaped channel therebetween.

The gas turbine engine of any proceeding clause, wherein the channel is sized and shaped to receive the composite leading edge of the composite portion.

The gas turbine engine of any proceeding clause, wherein any of the first leading edge protector or the second leading edge protector are coupled to their corresponding composite portion at the corresponding composite leading edge to define at least one seam.

The gas turbine engine of any proceeding clause wherein the at least one seam is two seams on either side of the airfoil, and the corresponding first leading length or second leading length is measured from the corresponding leading edge to the seam furthest from the leading edge.

The gas turbine engine of any proceeding clause wherein the first leading length and the second leading length are measured from their corresponding leading edge to their corresponding seam.

The gas turbine engine of any proceeding clause wherein an amount of overlap between the first sheath or the second sheath and their corresponding.

The gas turbine engine of the preceding clause, also including a disk-to-blade diametric (DBD) ratio defined as a ratio of a disk spacing length to the fan diameter, the disk spacing length being a distance between a forwardmost end of a fan disk and an intersection with the inlet taken along an engine centerline, wherein the DBD ratio of the gas turbine engine is 0.09 to 0.59, 0.15 to 0.35, or 0.19 to 0.27.

The gas turbine engine of any preceding clause, also including a disk-to-nacelle diametric (DND) ratio defined as a ratio of a disk spacing length to the fan diameter, the disk spacing length being a distance between a forwardmost end of a fan disk and an intersection with the inlet taken along an engine centerline, wherein the DND ratio of the gas turbine engine is 0.07 to 0.47, 0.15 to 0.35, or 0.15 to 0.25.

The gas turbine engine of any preceding clause, also including a disk-to-inlet length (DIL) ratio defined as a ratio of a disk spacing length to the fan diameter, the disk spacing length being a distance between a forwardmost end of a fan disk and an intersection with the inlet taken along an engine centerline, wherein the DIL ratio of the gas turbine engine is 0.30 to 0.80, 0.3 to 0.70, or 0.49 to 0.65.

The gas turbine engine of any preceding clause, further comprising a fan pressure ratio from 1.25 to 1.45.

The gas turbine engine of any preceding clause, further comprising an inlet length ratio that is a ratio of an inlet length to a diameter of the fan blade, wherein the inlet length defines an average distance from a leading edge of the fan blade to an inlet of the fan, and wherein the inlet length ratio is 0.15 to 0.4, or 0.15 to 0.3.

The gas turbine engine of any preceding clause, wherein the fan case further comprises an acoustic treatment disposed on an interior surface of the fan case, and, optionally, the acoustic treatment length is 50% to 90% of an inlet length.

The gas turbine engine of any preceding clause, wherein the number of the plurality of outlet guide vanes is at least twice the number of the plurality of fan blades.

The gas turbine engine of any preceding clause, wherein the low pressure turbine comprises at least three low pressure turbine stages or at least four low pressure turbine stages.

The gas turbine engine of any preceding clause, wherein plurality of outlet guide vanes further comprise serrated leading edges.

The gas turbine engine of any preceding clause, wherein the plurality of fan blades comprise composite materials that include a matrix and a plurality of fiber plies.

The gas turbine engine of any preceding clause, wherein the plurality of fiber plies are interwoven in in-plane and out-of-plane orientations, and/or the plurality of fiber plies are interwoven in three or more different orientation angles.

The gas turbine engine of any preceding clause, wherein a fan blade diameter of the fan blade is 65-80 inches, 80-95 inches, or 95-115 inches.

The gas turbine engine of any preceding clause, wherein the number of the plurality of fan blades is 14-26, 20-24, or 20-22.

The gas turbine engine of any preceding clause, wherein the blade solidity is 0.8 to 1.5, 1.0 to 2.0, or 1.25 to 1.75.

The gas turbine engine of any preceding clause, wherein the gas turbine engine has a bypass ratio of 10:1 to 17:1 or 12:1 to 15:1.

The gas turbine engine of any proceeding clause, wherein the fan drive turbine has between 3 and 5 stages.

The gas turbine engine of any proceeding clause, wherein the speed reduction device is a power gearbox having a power gearbox reduction ratio between 2:1 and 5:1.

The gas turbine engine of any proceeding clause, wherein a bypass ratio is between 10:1 and 22:1.

The gas turbine engine of any proceeding clause, wherein a fan blade tip speed of the fan is less than 1400 feet per second.

The gas turbine engine of any proceeding clause, wherein the first sheath and the second sheath each have a first wall, a second wall, and a third wall interconnecting the first wall and the second wall.

The gas turbine engine of any proceeding clause, wherein the first wall, second wall, and third wall of the leading edge protector are oriented and shaped such that they define a U-shaped or C-shaped channel therebetween.

The gas turbine engine of any proceeding clause, wherein the channel is sized and shaped to receive the composite leading edge of the composite portion.

The gas turbine engine of any proceeding clause, wherein any of the first leading edge protector or the second leading edge protector are coupled to their corresponding composite body at the corresponding composite leading edge to define at least one edge.

The gas turbine engine of any proceeding clause wherein the at least one edge is two edges on either side of the composite body, and the corresponding first leading length or second leading length is measured from the corresponding leading edge to an end of the edge furthest from the leading edge.

The gas turbine engine of any proceeding clause wherein the first leading length and the second leading length are measured from their corresponding leading edge to their corresponding edge.

The gas turbine engine of any proceeding clause where in the length of the first edge is greater than the length of the second edge, and the first edge is on a pressure side of the composite fan blade or composite outlet guide vane, and the second edge is on a suction side of the composite fan blade or composite outlet guide vane.

In view of the many possible examples to which the principles of the disclosure may be applied, it should be recognized that the illustrated examples are only preferred examples and should not be taken as limiting the scope. Rather, the scope is defined by the following claims. We therefore claim all that comes within the scope and spirit of these claims.

We claim:

1. A gas turbine engine comprising:
   a core turbine engine defining an engine centerline and comprising a low pressure turbine;
   a gearbox assembly coupled to the low pressure turbine;
   a fan coupled to the gearbox assembly and having a fan diameter and a plurality of composite fan blades, each of the composite fan blades having a blade solidity that is greater than or equal to 0.8 and less than or equal to 2.0, and each comprising a first composite body extending chordwise between a first composite body leading edge and a fan blade trailing edge, and a first leading edge protector having a fan blade leading edge different from, and receiving at least a portion of, the first composite body leading edge, wherein a first leading length (FLL) extends chordwise from the fan blade leading edge to a first end of the first leading edge protector, and a first chord length (FCL) extends chordwise from the fan blade leading edge to the fan blade trailing edge;
   a blade effective acoustic length (BEAL) defined as:

$$BEAL = \frac{2c^2}{S(1-rr)N_b}\cos(\gamma)$$

wherein c is the first chord length (FCL) at 75% span, S is a span of the fan blade, rr is a radius ratio of the fan, $\gamma$ is a stagger angle of the fan blade, and $N_b$ is the number of the plurality of composite fan blades;

a nacelle that includes a fan case that surrounds the fan, the fan case comprising an inlet disposed forward of the fan and an inlet length, wherein the inlet length is an axial distance between the fan blade leading edge and the inlet, as measured at a 75% span position of the fan blade;

a plurality of composite outlet guide vanes disposed aft of the fan and extending radially between the core turbine engine and the fan case, each of the composite outlet guide vanes comprising a second composite body extending chordwise from a second composite leading edge to an outlet guide vane trailing edge, and a second leading edge protector having an outlet guide vane leading edge different from, and receiving at least a portion of, the second composite leading edge, wherein a second leading length (SLL) extends chordwise from the outlet guide vane leading edge to a second end of the second leading edge protector, and a second chord length (SCL) extends from the outlet guide vane leading edge to the outlet guide vane trailing edge;

an acoustic spacing from the fan blade trailing edge to an outlet guide vane leading edge;

an acoustic spacing ratio (ASR) defined as:

$$ASR = \frac{1}{\left(\frac{Nv}{Nb}\right)} \cdot \frac{As}{BEAL}$$

wherein As is the acoustic spacing and Nv is the number of the plurality of outlet guide vanes; and an inlet-to-nacelle (ITN) ratio defined as a ratio of the inlet length to a maximum diameter of the nacelle, wherein the ASR of the gas turbine engine is 1.5 to 16.0, and the ITN ratio is 0.23 to 0.35, wherein the first leading length (FLL) and the first chord length (FCL) are related to the second leading length (SLL) and the second chord length (SCL) by a stage protection factor (SPF), and wherein $$SPF = \frac{\left(\frac{FLL}{FCL}\right)}{\left(\frac{SLL}{SCL}\right)}$$

and SPF is greater than or equal to 0.7 and less than or equal to 4 ($0.7 \leq SPF \leq 4$).

2. The gas turbine engine of claim 1 wherein the composite fan blades and the composite outlet guide vanes include a polymer matrix composite (PMC).

3. The gas turbine engine of claim 1, wherein at least one of the first leading edge protector or the second leading edge protector is a metallic leading edge protector.

4. The gas turbine engine of claim 1, wherein the first leading edge protector and the second leading edge protector each comprise a sheath.

5. The gas turbine engine of claim 1, further comprising a disk-to-blade diametric (DBD) ratio defined as a ratio of a disk spacing length to the fan diameter, the disk spacing length being a distance between a forwardmost end of a fan disk and an intersection with the inlet taken along an engine centerline, wherein the DBD ratio of the gas turbine engine is 0.09 to 0.59.

6. The gas turbine engine of claim 5, wherein the DBD ratio of the gas turbine engine is 0.15 to 0.35.

7. The gas turbine engine of claim 1, further comprising a disk-to-nacelle diametric (DND) ratio defined as a ratio of a disk spacing length to the fan diameter, the disk spacing length being a distance between a forwardmost end of a fan disk and an intersection with the inlet taken along an engine centerline, wherein the DND ratio of the gas turbine engine is 0.07 to 0.47.

8. The gas turbine engine of claim 7, wherein the DND ratio of the gas turbine engine is 0.15 to 0.35.

9. The gas turbine engine of claim 7, wherein the DND ratio of the gas turbine engine is 0.15 to 0.25.

10. The gas turbine engine of claim 1, wherein the fan blade leading edge is a sharp fan blade leading edge and the fan blade trailing edge is a sharp fan blade trailing edge from a root to a tip, and wherein the composite fan blade gradually increases to a maximum thickness along a midchord region therebetween.

11. The gas turbine engine of claim 1, wherein the SPF is greater than or equal to 0.95 and less than or equal to 2.5 (0.95≤SPF≤2.5).

12. The gas turbine engine of claim 1, further comprising a fan pressure ratio from 1.25 to 1.45.

13. The gas turbine engine of claim 1, wherein the ASR is 4.0 to 14.0.

14. The gas turbine engine of claim 1, wherein the ASR is 6.6 to 13.5.

15. The gas turbine engine of claim 1, wherein the first leading length (FLL) ranges from 6 cm to 19 cm and the second leading length (SLL) ranges from 1.5 cm to 4 cm.

16. The gas turbine engine of claim 1, wherein the first chord length (FCL) ranges from 24 cm to 77 cm and the second chord length (SCL) ranges from 9.3 cm to 31 cm.

17. The gas turbine engine of claim 1, wherein the first leading edge protector is coupled to the respective composite body to define a first edge on a first side of the composite fan blade and a second edge on a second side of the composite fan blade.

18. The gas turbine engine of claim 17, wherein a first leading length is defined by a length measured from the corresponding fan blade leading edge to a furthest portion of the first edge and a second leading length is defined by a length measured from the corresponding fan blade leading edge to a furthest portion of the second edge, wherein a ratio of the first leading length to the second leading length is between 1:1 and 3:1, and wherein the first side of the composite fan blade is a pressure side and the second side of the composite fan blade is a suction side.

19. The gas turbine engine of claim 17, wherein a first leading length is defined by a length measured from the corresponding fan blade leading edge to a furthest portion of the first edge and a second leading length is defined by a length measured from the corresponding fan blade leading edge to a furthest portion of the second edge, wherein a ratio of the first leading length to the second leading length is between 1.25:1 and 2.5:1, and wherein the first side of the composite fan blade is a pressure side and the second side of the composite fan blade is a suction side.

20. The gas turbine engine of claim 17, wherein a first leading length is defined by a length measured from the corresponding fan blade leading edge to a furthest portion of the first edge and a second leading length is defined by a length measured from the corresponding fan blade leading edge to a furthest portion of the second edge, wherein a ratio of the first leading length to the second leading length is between 1.5:1 and 2.5:1, and wherein the first side of the composite fan blade is a pressure side and the second side of the composite fan blade is a suction side.

\* \* \* \* \*